(12) United States Patent
Sirton

(10) Patent No.: US 11,700,182 B2
(45) Date of Patent: *Jul. 11, 2023

(54) AUTOMATIC CLASSIFICATION OF NETWORK DEVICES IN A NETWORK

(71) Applicant: Arista Networks, Inc., Santa Clara, CA (US)

(72) Inventor: Guy Sirton, Delta (CA)

(73) Assignee: ARISTA NETWORKS, INC., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/739,879

(22) Filed: May 9, 2022

(65) Prior Publication Data

US 2022/0337485 A1 Oct. 20, 2022

Related U.S. Application Data

(63) Continuation of application No. 16/584,618, filed on Sep. 26, 2019, now Pat. No. 11,329,886.

(60) Provisional application No. 62/738,601, filed on Sep. 28, 2018.

(51) Int. Cl.
*H04L 41/12* (2022.01)
*H04L 41/22* (2022.01)
*G06N 5/04* (2023.01)
*G06N 5/01* (2023.01)

(52) U.S. Cl.
CPC ............. *H04L 41/12* (2013.01); *G06N 5/01* (2023.01); *G06N 5/04* (2013.01); *H04L 41/22* (2013.01)

(58) Field of Classification Search
CPC ............................ H04L 41/12; H04L 41/122
See application file for complete search history.

(56) References Cited

U.S. PATENT DOCUMENTS

| 11,329,886 B2* | 5/2022 | Sirton | H04L 41/22 |
| 2015/0074246 A1* | 3/2015 | Premji | H04L 49/65 709/220 |
| 2018/0241632 A1* | 8/2018 | Shetty | H04L 41/12 |
| 2018/0262392 A1* | 9/2018 | White | H04L 51/214 |

* cited by examiner

*Primary Examiner* — Nicholas P Celani
(74) *Attorney, Agent, or Firm* — Sprinkle IP Law Group

(57) ABSTRACT

The automatic classification of network devices in a network. Specifically, the disclosure entails the designation of network device roles to network devices, as well as the clustering of network devices into logical groups. The association of network devices with network device roles and logical groups may be contingent on the connections between the network devices and a set of network device classification heuristics.

20 Claims, 17 Drawing Sheets

AUTOMATIC CLASSIFICATION OF NETWORK DEVICES IN A NETWORK

CROSS-REFERENCE TO RELATED APPLICATIONS

This application is a continuation of and claims a benefit of priority under 35 U.S.C. 120 from U.S. patent application Ser. No. 16/584,618, filed Sep. 29, 2019, entitled "AUTOMATIC CLASSIFICATION OF NETWORK DEVICES IN A NETWORK," issued as U.S. Pat. No. 11,329,886, which claims a benefit of priority under 35 U.S.C. § 119(e) to U.S. Provisional Patent Application No. 62/738,601, filed on Sep. 28, 2018, which are incorporated herein by reference in their entirety.

BACKGROUND

Information technology (IT) networks may include numerous interconnected computing devices. The automatic classification of these computing devices may be displayed to users such as network administrators.

SUMMARY

In general, in one aspect, the invention relates to a method for effecting network classification. The method includes generating, based on network topology information for a network, a network connectivity graph representative of the network, wherein the network connectivity graph includes a plurality of nodes interconnected by a plurality of edges, assigning network device roles to at least a portion of the plurality of nodes based on at least a portion of the plurality of edges and a set of network device classification heuristics, and performing a service action based on the network device roles.

In general, in one aspect, the invention relates to a non-transitory computer readable medium (CRM). The non-transitory CRM includes computer readable program code, which when executed by a computer processor, enables the computer processor to generate, based on network topology information for a network, a network connectivity graph representative of the network, wherein the network connectivity graph includes a plurality of nodes interconnected by a plurality of edges, assign network device roles to at least a portion of the plurality of nodes based on at least a portion of the plurality of edges and a set of network device classification heuristics, and perform a service action based on the network device roles.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-15, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to the automatic classification of network devices (also referenced in the FIGs as "ND" or "NDs") in a network. Specifically, one or more embodiments of the invention entail the designation of network device roles to network devices, as well as the clustering of network devices into logical groups. The association of network devices with network device roles and logical groups may be contingent on the connections between the network devices and a set of network device classification heuristics.

Figure 1:
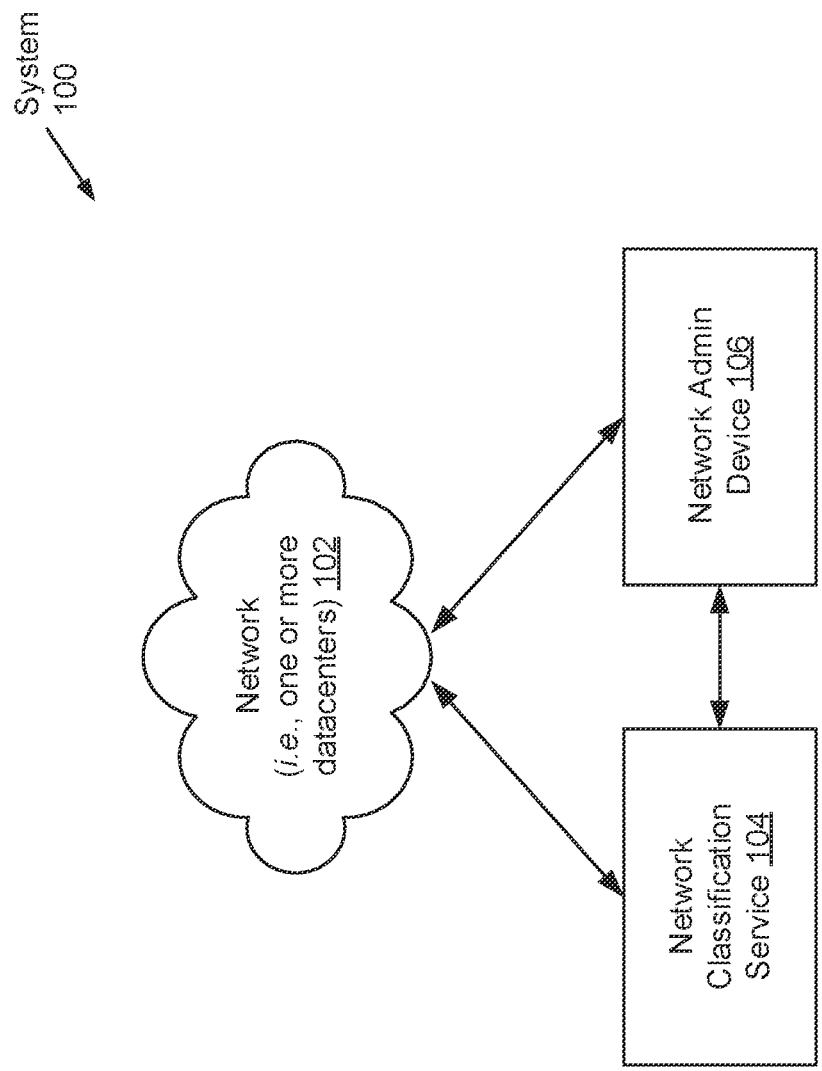
FIG. 1 shows a system in accordance with one or more embodiments of the invention.

FIG. 1 shows a system in accordance with one or more embodiments of the invention. The system (100) may include a network (102), a network analysis service (104), and a network admin device (106), which may operatively connect with one another. Each of these system (100) components is described below.

In one embodiment of the invention, the network (102) may represent the global information technology (IT) infrastructure belonging to or associated with a given organization. Deployment of the aforementioned infrastructure may entail a single- or multi-datacenter solution. A datacenter (not shown), in turn, may encompass a collection of interconnected network devices (not shown), which may be co-located at a given geographical site. Intra-communications amongst network devices of a given datacenter (in a single-datacenter solution), or inter-communications amongst network devices between datacenters (in a multi-datacenter solution), may be enabled through wired and/or wireless connections that may employ any existing wired and/or wireless communication protocol(s). By way of examples, when deployed as a single-datacenter solution, the network (102) may represent a local area network (LAN), whereas when deployed as a multi-datacenter solution, the network (102) may represent a wide area network (WAN), which may interconnect multiple LANs. The network (102) is further exemplified and described below in FIG. 2A.

In one embodiment of the invention, the network classification service (104) may represent a network topology analytics platform. Network topology analytics may refer to the classification of network devices to network device roles and into logical groups through the interpretation of network topology information (described below). The network classification service (104) may be implemented using one or more servers (not shown). Each server may refer to a physical server, residing in a datacenter (external to the network (102)), or a virtual server, which may reside in a cloud computing environment. Additionally or alternatively, the network classification service (104) may be implemented using one or more computing systems similar to the exemplary computing system shown in FIG. 15. The network classification service (104) is further exemplified and described below in FIG. 3.

In one embodiment of the invention, the network admin device (106) may represent any physical appliance or computing system operated by one or more administrators of the network (102). An administrator of the network (102) may refer to an individual or entity that may be responsible for overseeing network (102) operations and maintenance. Examples of the network admin device (106) may include, but are not limited to, a desktop computer, a laptop computer, a tablet computer, a server, a smartphone, or any other computing system similar to the exemplary computing system shown in FIG. 15.

While FIG. 1 shows a configuration of components, other system (100) configurations may be used without departing from the scope of the invention.

Figure 2A:
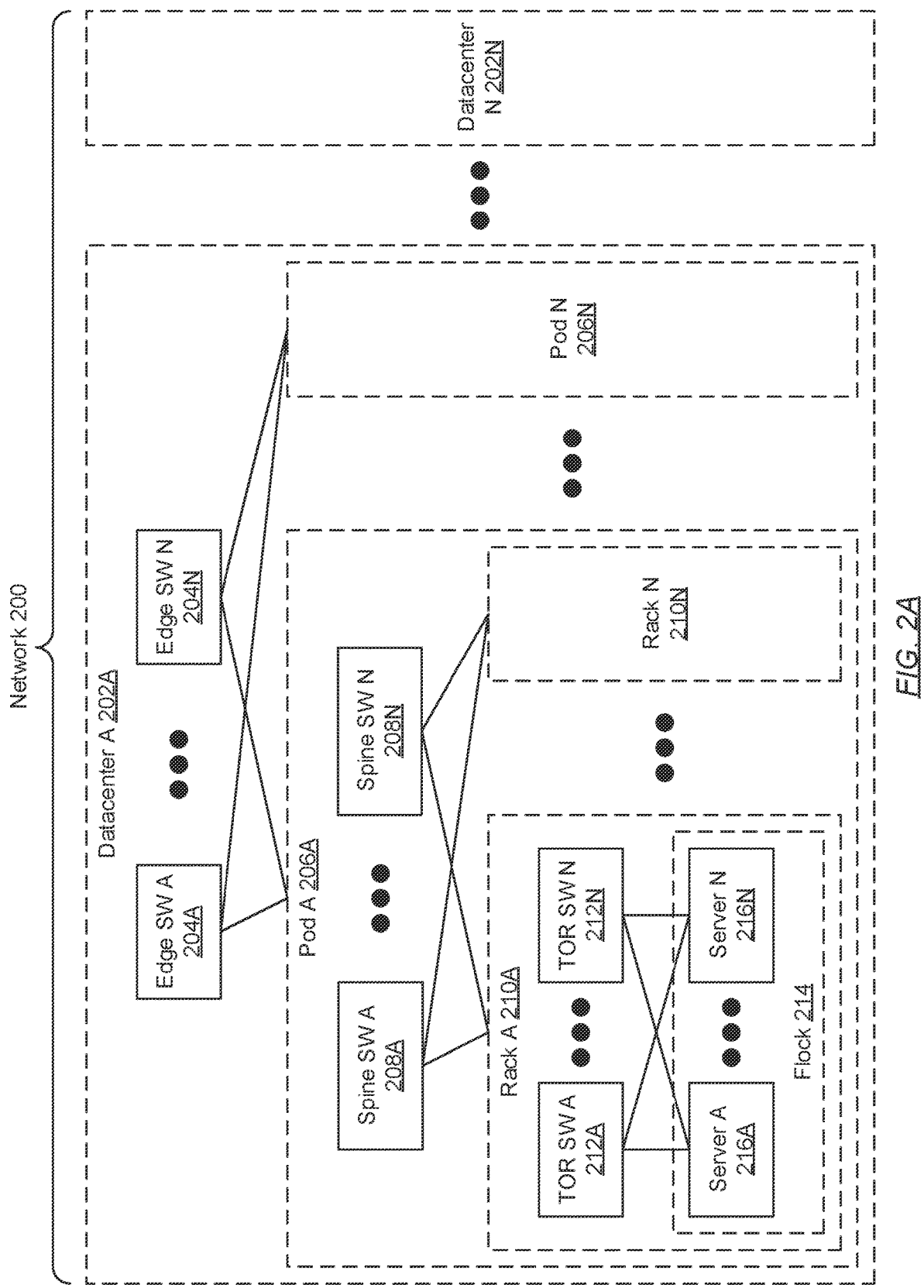
FIG. 2A shows an exemplary network in accordance with one or more embodiments of the invention.

FIG. 2A shows an exemplary network in accordance with one or more embodiments of the invention. The network (200) may include various interconnected network devices. A network device may represent any physical computing system that includes at least one computer processor, memory (e.g., random access memory (RAM), shared memory, etc.), and two or more physical network interfaces (also referred to as ports). Generally, a network device may be capable of generating, sending, and/or receiving network traffic—i.e., data packets. Furthermore, the network various interconnected network devices may include, but are not limited to, one or more edge network devices (204A-204N), one or more spine network devices (208A-208N), one or more top-of-rack (TOR) network devices (212A-212N), and one or more servers (216A-216N).

In one embodiment of the invention, an edge network device (204A-204N) may refer to any network device that may topologically reside at the meeting point between two networks, or two datacenters. Specifically, an edge network device (204A-204N) may include functionality to facilitate the entry of network traffic into a given network (or datacenter) from an external network (or datacenter) and, conversely, the exit of network traffic out of the given network (or datacenter) to an external network (or datacenter). A spine network device (208A-208N), on the other hand, may refer to any network device that may topologically connect one or more edge network devices (204A-204N) to one or more TOR network devices (212A-212N)—both of which may collectively be referred to herein as leaf network devices. Furthermore, a TOR network device (212A-212N) may refer to any network device that may topologically connect one or more spine network devices (208A-208N) to one or more end network devices—e.g., server(s) (216A-216N) and non-server devices (not shown) such as mobile handheld devices, networked printers, networked scanners, etc. A server (216A-216N) may refer to any network device whereon one or more workloads may execute. These workloads may be directed to, for example, the processing large scale and/or complex datasets. Moreover, any edge network device (204A-204N), any spine network device (208A-208N), and any TOR network device (212A-212N) may be synonymous with a switch, a router, or a multilayer switch.

In one embodiment of the invention, the various interconnected network devices of the network (200) may be assigned (or clustered) into one or more logical groups. These logical groups may include, but are not limited to, a datacenter logical group, a pod logical group, a rack logical group, and a flock logical group. In reverse order, a flock logical group may reference a smallest cluster of network devices, which may include a flock (214) entailing one or more servers (216A-216N). A rack logical group may reference a next largest cluster of network devices, which may include a rack (210A-210N) entailing one or more TOR network devices (212A-212N) and a flock (214). Thereafter, a pod logical group may reference a next largest cluster of network devices, which may include a pod (206A-206N) entailing one or more spine network devices (208A-208N) and one or more racks (210A-210N). Lastly, a datacenter logical group may reference a next largest cluster of network devices, which may include a datacenter (202A-202N) entailing one or more edge network devices (204A-204N) and one or more pods (206A-206N).

While FIG. 2A shows a configuration of components, other network (200) configurations may be used without departing from the scope of the invention.

Figure 2B:
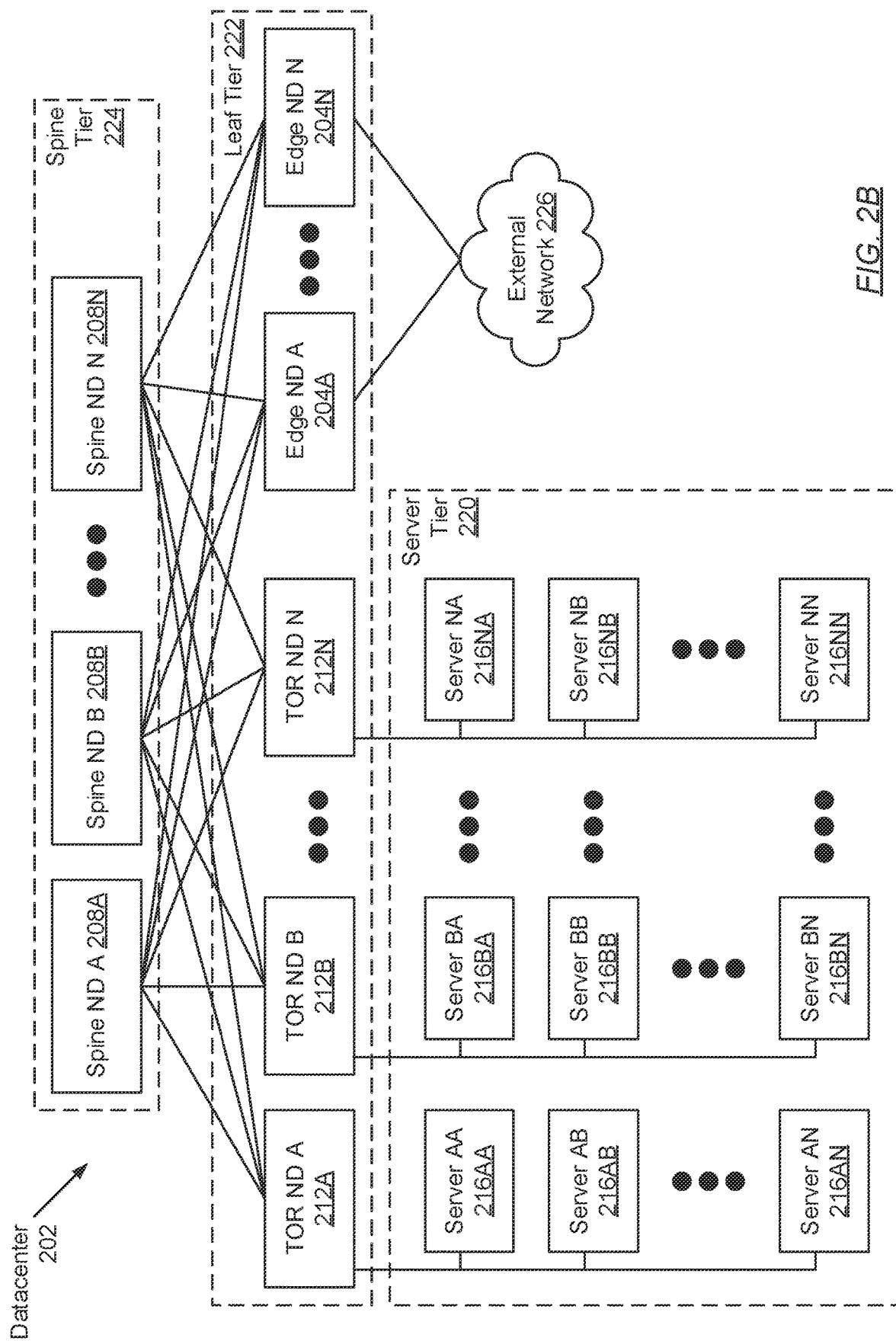
FIG. 2B shows an exemplary datacenter in accordance with one or more embodiments of the invention.

FIG. 2B shows an exemplary datacenter in accordance with one or more embodiments of the invention. The datacenter (202) may follow a Clos network architecture and, accordingly, may hierarchically arrange the various network devices therein into multiple tiers—e.g., a server tier (220), a leaf tier (222), and a spine tier (224). Each of these datacenter (202) components is described below.

In one embodiment of the invention, the server tier (220) may refer to first a logical grouping of at least a portion of the network devices of the datacenter (202). The network devices, forming the server tier (220), may include, but are not limited to, one or more servers (216AA-216NN). By way of examples, each server (216AA-216NN) may be representative of a dynamic host configuration protocol (DHCP) server, a database server, an application server, a file server, a print server, a mail server, or any other server type.

In one embodiment of the invention, the leaf tier (222) may refer to a second logical grouping of at least another portion of the network devices of the datacenter (202). The network devices, forming the leaf tier (222), may include, but are not limited to, one or more top-of-rack (TOR) network devices (212A-212N) and one or more edge network devices (204A-204N).

In one embodiment of the invention, the spine tier (224) may refer to a third logical grouping of at least a remaining portion of the network devices of the datacenter (202). The network devices, forming the spine tier (224), may include, but are not limited to, one or more spine network devices (208A-208N).

While FIG. 2B shows a configuration of components, other datacenter (202) configurations may be used without departing from the scope of the invention. For example, the spine tier (224) may further include one or more core network devices (not shown).

Figure 2C:
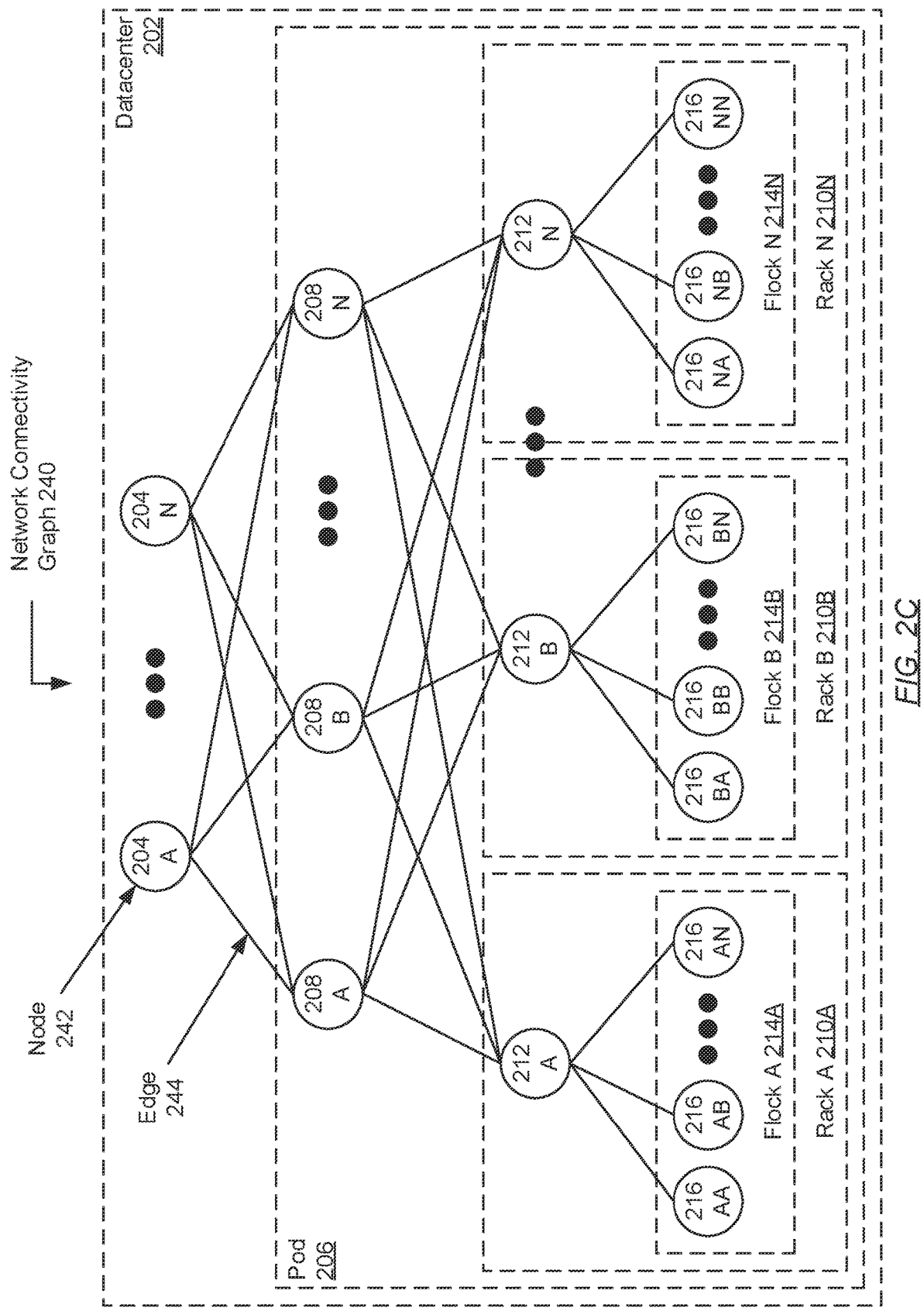
FIG. 2C shows an exemplary network connectivity graph in accordance with one or more embodiments of the invention.

FIG. 2C shows an exemplary network connectivity graph in accordance with one or more embodiments of the invention. The network connectivity graph (240), shown herein, may correspond to similar components illustrated in the exemplary network of FIG. 2A and the exemplary datacenter of FIG. 2B. Further, the network connectivity graph (240) may refer to a set of nodes (242) interconnected by a set of edges (244) in topological space. Each node (242) may reflect a given network device of the network, whereas each edge (244) may reflect a given connection between a given pair of network devices of the network.

While FIG. 2C shows a configuration of components, other network connectivity graph (240) configurations may be used without departing from the scope of the invention.

Figure 3:
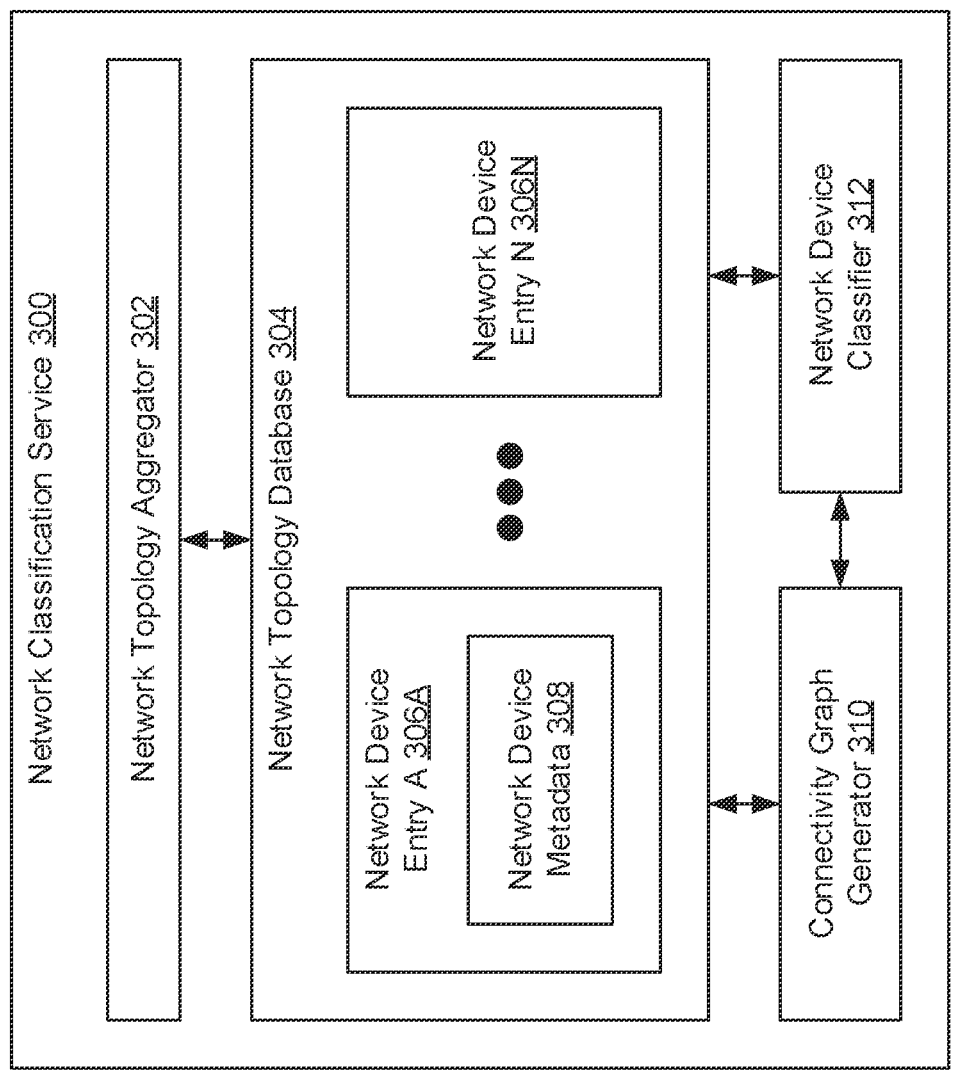
FIG. 3 shows a network classification service in accordance with one or more embodiments of the invention.

FIG. 3 shows a network classification service in accordance with one or more embodiments of the invention. The network classification service (300) may include a network topology aggregator (302), a network topology database (304), a connectivity graph generator (310), and a network device classifier (312). Each of these network classification service (300) components is described below.

In one embodiment of the invention, the network topology aggregator (302) may refer to a computer program that may execute on the underlying hardware of the network classification service (300). Specifically, the network topology aggregator (302) may be designed and configured to aggregate network topology information pertinent to the network (not shown) and update—e.g., generate, remove, or modify one or more network device entries (306A-306N) (described below) of—the network topology database (304) based on the aggregated network topology information. Network topology information may include, but is not limited to, identification information and connectivity information associated with the various interconnected network devices of the network. For a given network device, identification information may refer to one or more globally unique identifiers associated with the given network device—e.g., a media access control (MAC) address, an Internet Protocol (IP) address, etc.—whereas connectivity information may refer to details describing the one or more connections between the given network device and one or more other network device(s) of the network. One of ordinary skill will appreciate that the network topology aggregator (302) may perform other functionalities without departing from the scope of the invention.

In one embodiment of the invention, the above-mentioned network topology information may be aggregated using one or more networking protocols. For example, the link layer discovery protocol (LLDP) may be used, by the various interconnected network devices of the network, to advertise their respective identities and capabilities to one another, as well as the network classification service (300). Embodiments of the invention are not limited to employing the aforementioned exemplary networking protocol to gather network topology information. By way of other examples, network topology information may be collected using the address resolution protocol (ARP), the dynamic host configuration protocol (DHCP), and various proprietary protocols that may, at least in part, be used to aggregate network topology information.

In one embodiment of the invention, the network topology database (304) may refer to a repository for storing network device metadata (308). The network device metadata (308) may encompass descriptive information pertaining to the various interconnected network devices of the network. Further, the network device metadata (308) may include, but is not limited to, the above-mentioned identification and connectivity information, and one or more network device role tags representative of unique labels associating a given network device with one or more network device roles, respectively.

In one embodiment of the invention, the network topology database (304) may be implemented using one or more physical storage devices (not shown). Each physical storage device may include non-transitory computer readable media on which information may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the physical storage devices may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the connectivity graph generator (310) may refer to a computer program that may execute on the underlying hardware of the network classification service (300). Specifically, the connectivity graph generator (310) may be designed and configured to generate a network connectivity graph (see e.g., FIG. 2C) based on the network device metadata (308), for the various network devices of the network, stored in the network topology database (304). One of ordinary skill will appreciate that the connectivity graph generator (310) may perform other functionalities without departing from the scope of the invention.

In one embodiment of the invention, the network device classifier (312) may refer to a computer program that may execute on the underlying hardware of the network classification service (300). Specifically, the network device classifier (312) may be designed and configured to assign network device roles to network devices of the network based on a network connectivity graph (see e.g., FIG. 2C) generated for the network and a set of prescribed network device classification heuristics. One of ordinary skill will appreciate that the network device classifier (312) may perform other functionalities without departing from the scope of the invention.

While FIG. 3 shows a configuration of components, other network classification service (300) configurations may be used without departing from the scope of the invention.

Figure 4:
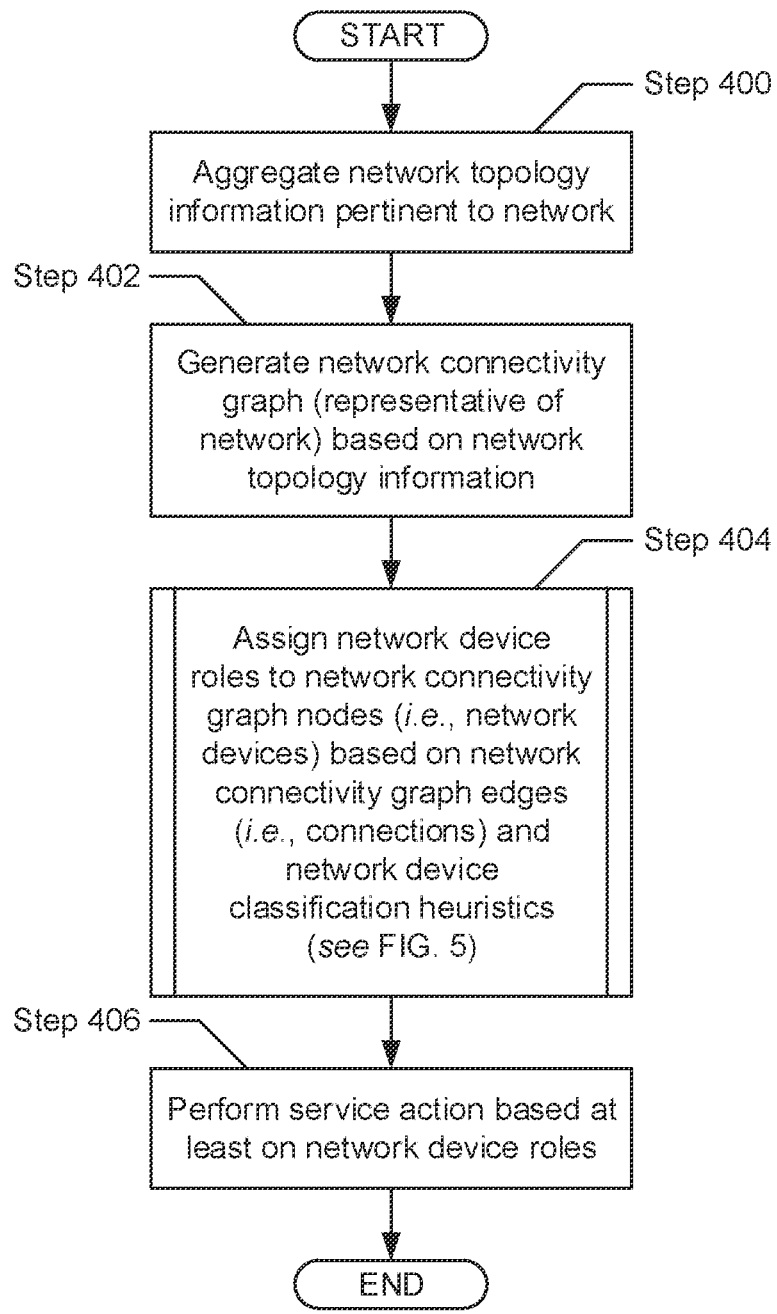
FIG. 4 shows a flowchart describing a method for automatically classifying network devices in a network in accordance with one or more embodiments of the invention.

FIG. 4 shows a flowchart describing a method for automatically classifying network devices in a network in accordance with one or more embodiments of the invention. The various steps outlined below may be performed by the network analysis service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, network topology information is aggregated. In one embodiment of the invention, the aggregated network topology information may be pertinent to a network (described above) (see e.g., FIG. 1). Specifically, network topology information may include, but is not limited to, identification information and connectivity information associated with the various interconnected network devices of the network. For a given network device, identification information may refer to one or more globally unique identifiers associated with the given network device—e.g., a media access control (MAC) address, an Internet Protocol (IP) address, etc.—whereas connectivity information may refer to details describing the one or more connections between the given network device and one or more other network device(s) of the network.

In Step 402, a network connectivity graph (see e.g., FIG. 2C) is generated based on the network topology information (aggregated in Step 400).

In Step 404, network device roles are assigned, to network devices of the network, based on the network connectivity graph (generated in Step 402) and a set of prescribed network device classification heuristics. In one embodiment of the invention, the network device roles bestowed upon a given network device may include, but are not limited to, a server, a server candidate, a top-of-rack (TOR) network device, a TOR network device candidate, a spine network device, a spine network device candidate, an edge network device, and an edge network device candidate. Further, the set of prescribed network device classification heuristics may refer to a collection of rules through which designation of the network device roles may be facilitated.

In Step 406, a service action is performed based at least on the network device roles (assigned in Step 404). In one embodiment of the invention, the service action may entail the generation of a delta assessment outlining any differences between an expected network topology (derived from processes other than and prior to the automatic classification of network devices disclosed herein) and the actual network topology (derived from the disclosed automatic classification of network devices).

Figure 5:
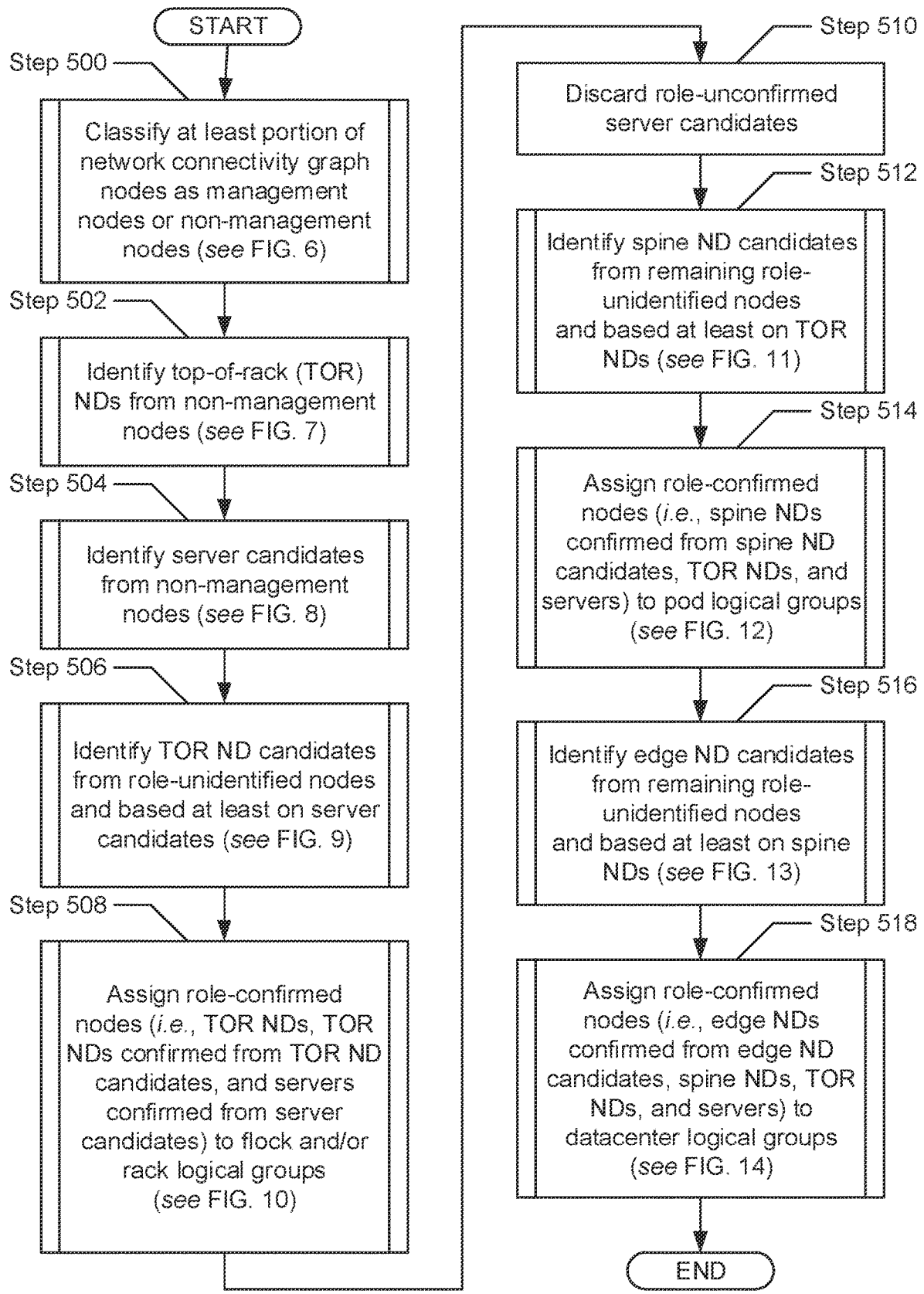
FIG. 5 shows a flowchart describing a method for assigning network device roles in accordance with one or more embodiments of the invention.

FIG. 5 shows a flowchart describing a method for assigning network device roles in accordance with one or more embodiments of the invention. The various steps outlined below may be performed by the network analysis service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, at least a portion of the nodes, forming a network connectivity graph (see e.g., FIG. 2C), are classified into a set of management nodes and a set of non-management nodes. In one embodiment of the invention, a management node—corresponding to a management network device—may refer to a network device that may include functionality to manage one or more other network devices, while itself may or may not be managed by another set of network devices. On the other hand, a non-management node—corresponding to a non-management network device—may alternatively refer to a network device that may be managed by one or more other network devices, while it may lack functionality to manage other network devices. Classification of the nodes as management or non-management nodes is further described below in FIG. 6.

In Step 502, one or more top-of-rack (TOR) network devices is/are identified from the set of management nodes (obtained in Step 500). In one embodiment of the invention, a TOR network device may refer to a network device serving as a gateway to a set (or flock) of servers residing in a given rack. Identification of the TOR network device(es) is further described below in FIG. 7.

In Step 504, one or more server candidates is/are identified from the set of non-management nodes (obtained in Step 500). In one embodiment of the invention, a server candidate may refer to a network device regarded as suitable for designation of the server network device role. Identification of the server candidate(s) is further described below in FIG. 8.

In Step 506, one or more TOR network device candidates is/are identified from a first set of role-unidentified nodes. In one embodiment of the invention, a TOR network device candidate may refer to a network device regarded as suitable for designation of the TOR network device network device role. Identification of the TOR network device candidate(s) is further described below in FIG. 9.

In Step 508, a first set of role-confirmed nodes are assigned to one or more flock and/or rack logical groups. In one embodiment of the invention, the first set of role-confirmed nodes may include nodes representative of the TOR network device(es) (identified in Step 502), one or more additional TOR network devices derived from the TOR network device candidate(s) (identified in Step 506), and one or more server(s) derived from the server candidate(s) (identified in Step 504). Assignment of the first set of role-confirmed nodes, to appropriate flock and/or rack logical groups, is further described below in FIG. 10.

In Step 510, any role-unconfirmed server candidates are discarded. In one embodiment of the invention, a role-unconfirmed server candidate may refer to a node, representative of a server candidate (identified in Step 504), which had not been designated the server network device role (in Step 508). Further, a role-unconfirmed server candidate may refer to other non-server end network devices (e.g., mobile handheld devices, networked input devices, networked output devices, etc.) of the network. Discarding of any role-unconfirmed server candidates may entail removal of the respective nodes from the network connectivity graph, and removal of the respective network device entries from the network topology database (see e.g., FIG. 3).

In Step 512, one or more spine network device candidates is/are identified from a second set of role-unidentified nodes. In one embodiment of the invention, a spine network device candidate may refer to a network device regarded as suitable for designation of the spine network device network device role. Identification of the spine network device candidate(s) is further described below in FIG. 11.

In Step 514, a second set of role-confirmed nodes are assigned to one or more pod logical groups. In one embodiment of the invention, the second set of role-confirmed nodes may include nodes representative of the first set of role-confirmed nodes (mentioned in Step 508) and one or more spine network devices derived from the spine network device candidate(s) (identified in Step 512). Assignment of the second set of role-confirmed nodes, to an appropriate pod logical group, is further described below in FIG. 12.

In Step 516, one or more edge network device candidates is/are identified from a third set of role-unidentified nodes. In one embodiment of the invention, an edge network device candidate may refer to a network device regarded as suitable for designation of the edge network device network device role. Identification of the edge network device candidate(s) is further described below in FIG. 13.

In Step 518, a third set of role-confirmed nodes are assigned to one or more datacenter logical groups. In one embodiment of the invention, the third set of role-confirmed nodes may include nodes representative of the second set of role-confirmed nodes (mentioned in Step 514) and one or more edge network devices derived from the edge network device candidate(s) (identified in Step 516). Assignment of the third set of role-confirmed nodes, to an appropriate datacenter logical group, is further described below in FIG. 14.

Figure 6:
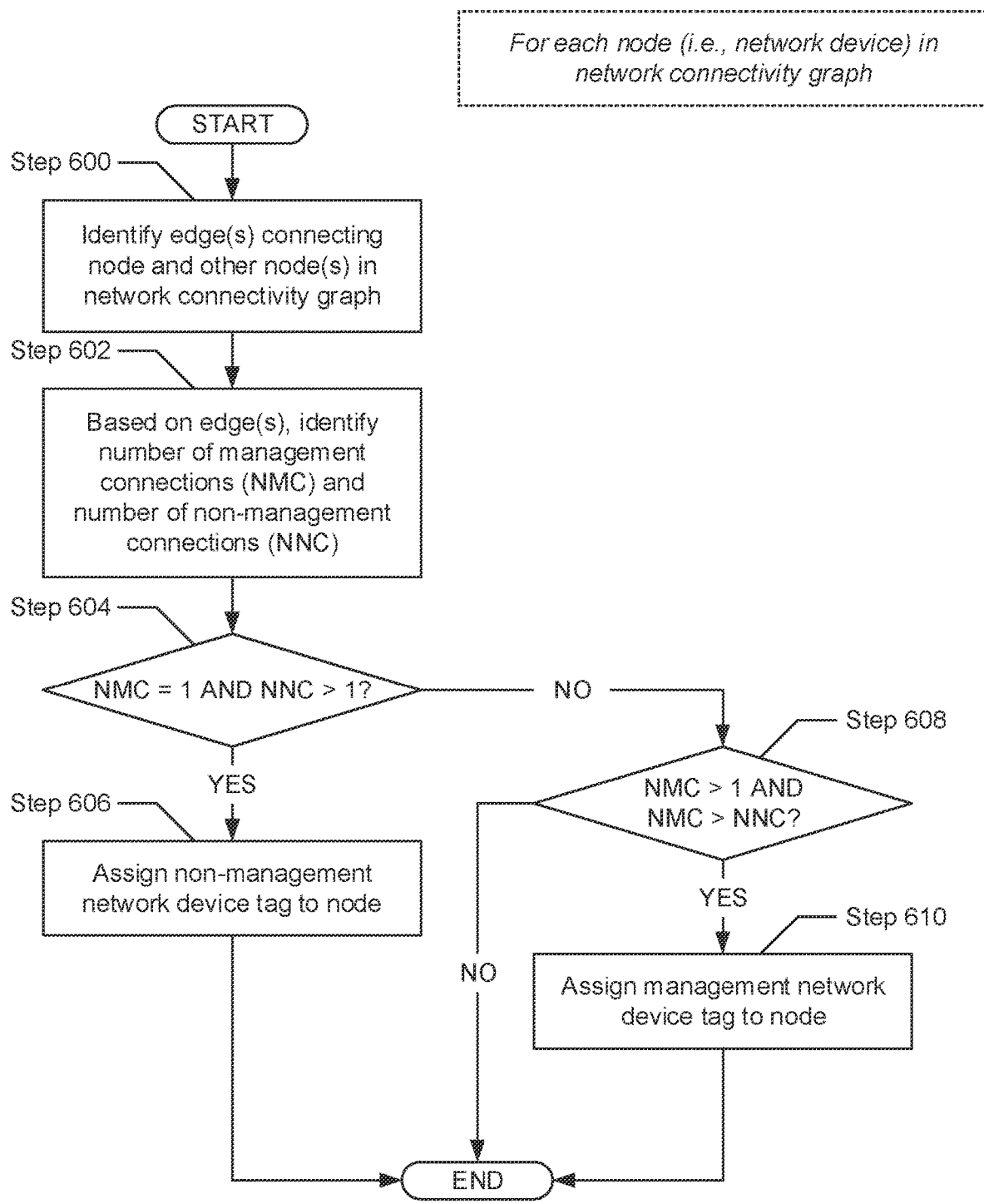
FIG. 6 shows a flowchart describing a method for classifying network connectivity graph nodes in accordance with one or more embodiments of the invention.

FIG. 6 shows a flowchart describing a method for classifying network connectivity graph nodes in accordance with one or more embodiments of the invention. The various steps outlined below may be performed by the network analysis service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Hereinafter, the various steps outlined below—representative of an iteration of the described method—may be performed for each node of a network connectivity graph (see e.g., FIG. 2C) for a given network.

Accordingly, in Step 600, one or more edges, associated with a given node, is/are identified. In one embodiment of the invention, each identified edge may represent a connection between the given node (i.e., a given network device) and another node (i.e., another network device) of the network connectivity graph (i.e., the network).

In Step 602, based on the edge(s) (identified in Step 600), a number of management connections (NMC) and a number of non-management connections (NNC) are identified. In one embodiment of the invention, a management connection may refer to a connection between a pair of network devices, where one of the network interfaces (or ports) belonging to one of the pair of network devices—on either end of the connection—may represent a built-in out-of-band management port or may otherwise be configured to act as a management port. Conversely, a non-management connection may refer to any other connection between a pair of network devices, which do not satisfy the aforementioned criteria respective to a management connection.

In Step 604, a determination is made as to whether a first criteria are satisfied. Specifically, the first criteria may require that the NMC (identified in Step 602) equals one and the NNC (also identified in Step 602) exceeds one. In one embodiment of the invention, if it is determined that the first criteria are satisfied, then the process proceeds to Step 606. On the other hand, in another embodiment of the invention, if it is alternatively determined that the first criteria are not satisfied, then the process alternatively proceeds to Step 608.

In Step 606, after determining (in Step 604) that the above-mentioned first criteria are satisfied, a non-management network device tag is assigned to the given node. In one embodiment of the invention, the non-management network device tag may refer to a unique label (i.e., network device metadata) used to associate the given node with a non-management network device class.

In Step 608, after alternatively determining (in Step 604) that the above-mentioned first criteria are not satisfied, a determination is made as to whether a second criteria are satisfied. Specifically, the second criteria may require that the NMC (identified in Step 602) exceeds one and the NNC (also identified in Step 602). In one embodiment of the invention, if it is determined that the second criteria are satisfied, then the process proceeds to Step 610. On the other hand, in another embodiment of the invention, if it is alternatively determined that the second criteria are not satisfied, then the process ends.

In Step 610, after determining (in Step 608) that the above-mentioned second criteria are not satisfied, a management network device tag is assigned to the given node. In one embodiment of the invention, the management network device tag may refer to a unique label (i.e., network device metadata) used to associate the given node with a management network device class.

Figure 7:
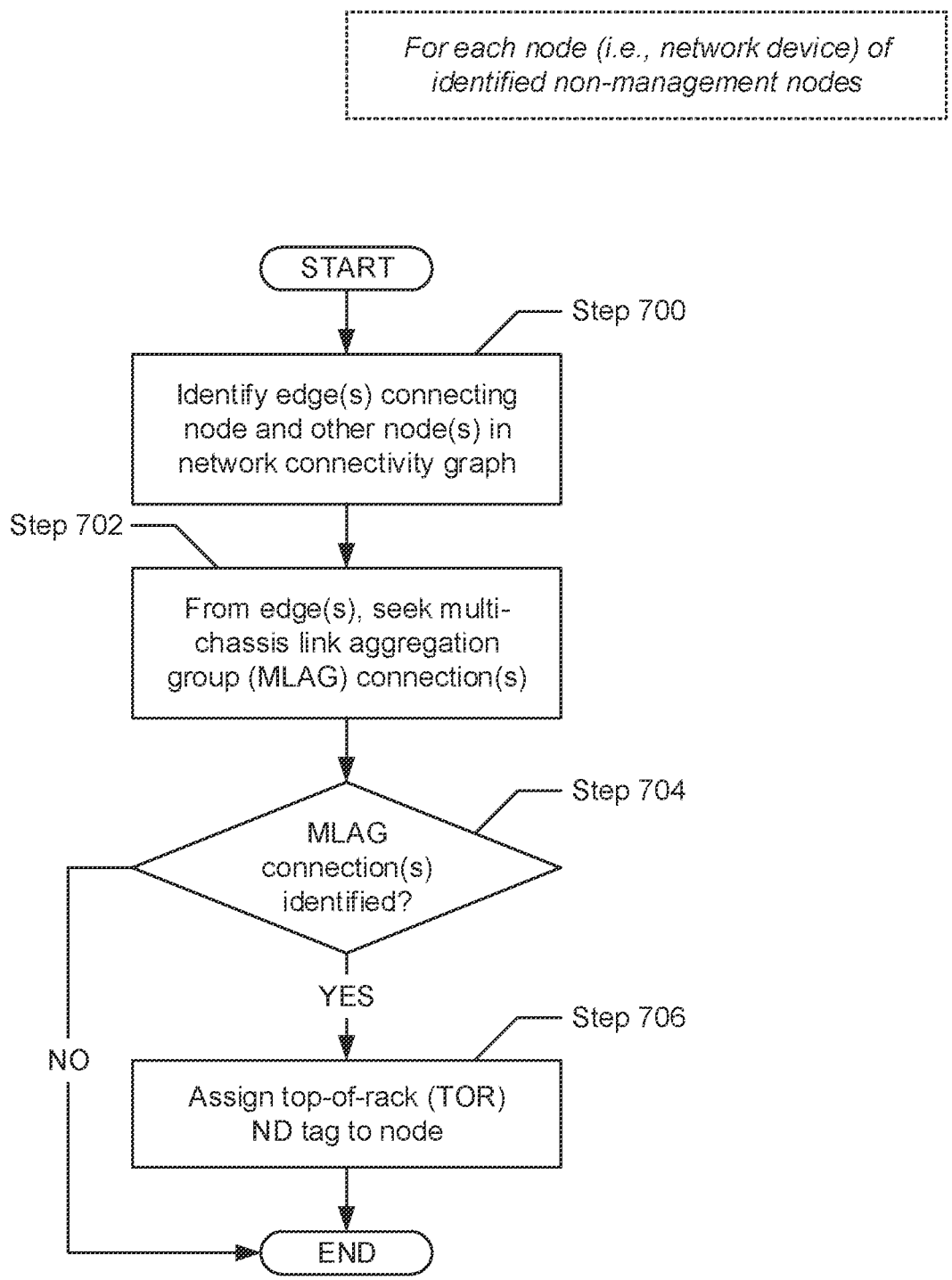
FIG. 7 shows a flowchart describing a method for identifying top-of-rack network devices in accordance with one or more embodiments of the invention.

FIG. 7 shows a flowchart describing a method for identifying top-of-rack network devices in accordance with one or more embodiments of the invention. The various steps outlined below may be performed by the network analysis service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Hereinafter, the various steps outlined below—representative of an iteration of the described method—may be performed for each node of a set of identified non-management nodes (see e.g., FIG. 6) of a network connectivity graph (see e.g., FIG. 2C) for a given network.

Accordingly, in Step 700, one or more edges, associated with a given node, is/are identified. In one embodiment of the invention, each identified edge may represent a connection between the given node (i.e., a given network device) and another node (i.e., another network device) of the network connectivity graph (i.e., the network).

In Step 702, based on the edge(s) (identified in Step 700), one or more multi-chassis link aggregation group (MLAG) connections is/are sought (i.e., attempted to be identified). In one embodiment of the invention, a MLAG may refer to a virtual network device implemented through the link bundling of two or more peer physical network devices. A MLAG connection, accordingly, may refer to an edge (i.e., connection) interconnecting the given node to one or more peer network devices, where the given node and the peer network device(s) may form a MLAG.

In Step 704, a determination is made as to whether at least one MLAG connection has been identified for the given node. In one embodiment of the invention, if it is determined that the edge(s) include at least one MLAG connection, then the process proceeds to Step 706. On the other hand, in another embodiment of the invention, if it is alternatively determined that a MLAG connection is not represented in the edge(s), then the process alternatively ends.

In Step 706, after determining (in Step 704) that at least one MLAG connection is represented amongst the edge(s) (identified in Step 702), a top-of-rack (TOR) network device tag is assigned to the given node. In one embodiment of the invention, the TOR network device tag may refer to a unique label (i.e., network device metadata) used to associate the given node with a TOR network device role.

Figure 8:
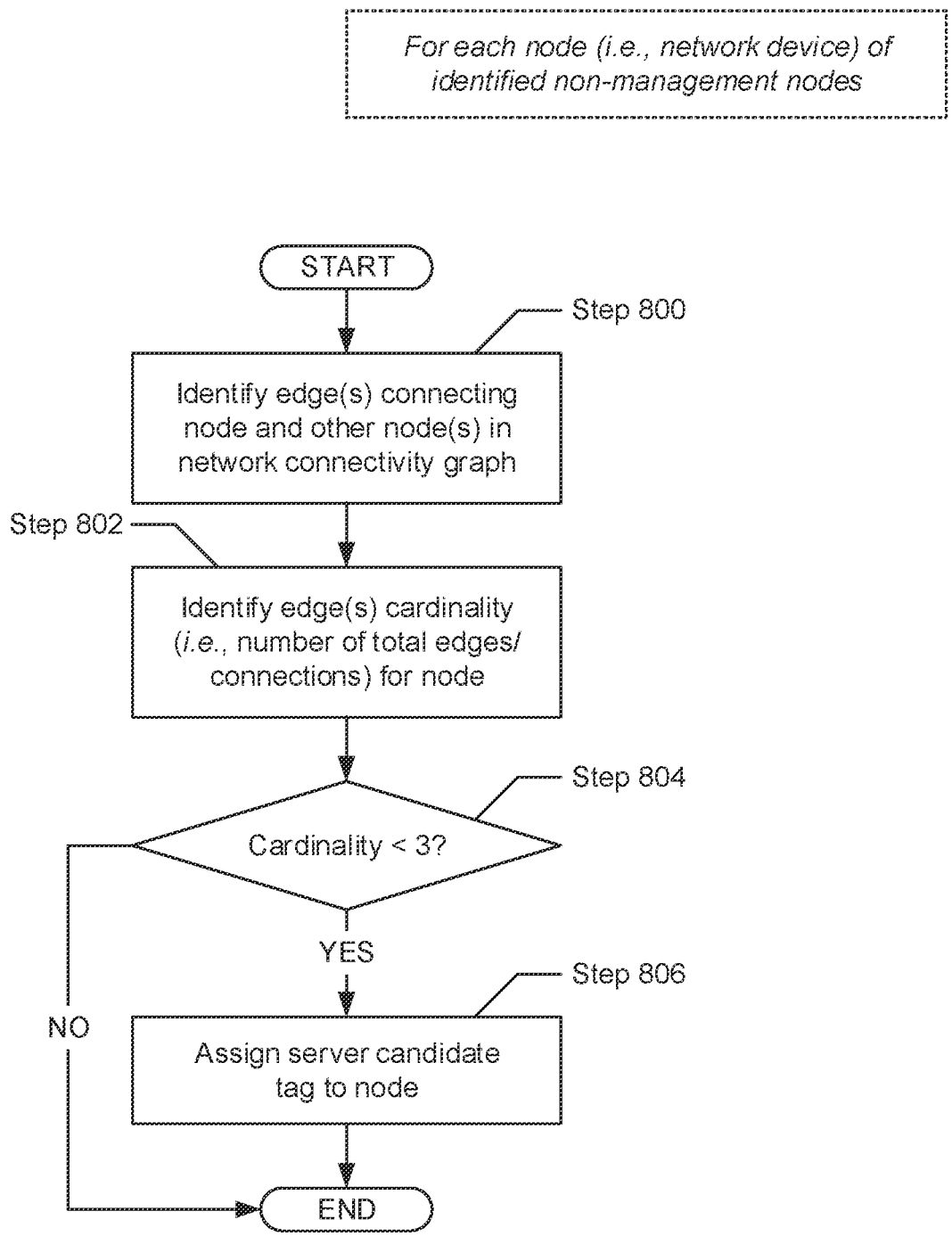
FIG. 8 shows a flowchart describing a method for identifying server candidates in accordance with one or more embodiments of the invention.

FIG. 8 shows a flowchart describing a method for identifying server candidates in accordance with one or more embodiments of the invention. The various steps outlined below may be performed by the network analysis service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Hereinafter, the various steps outlined below—representative of an iteration of the described method—may be performed for each node of a set of identified non-management nodes (see e.g., FIG. 6) of a network connectivity graph (see e.g., FIG. 2C) for a given network.

Accordingly, in Step 800, one or more edges, associated with a given node, is/are identified. In one embodiment of the invention, each identified edge may represent a connection between the given node (i.e., a given network device) and another node (i.e., another network device) of the network connectivity graph (i.e., the network).

In Step 802, a cardinality of the edge(s) (identified in Step 800) is identified. In one embodiment of the invention, the cardinality of a set of elements may refer to the number of elements in the set. Accordingly, the cardinality of the edge(s) may reference the number of edges (i.e., connections) associated with the given node.

In Step 804, a determination is made as to whether the cardinality (identified in Step 802) falls short of a cardinality threshold—e.g., three. In one embodiment of the invention, if it is determined that the cardinality is less than the cardinality threshold, then the process proceeds to Step 806. On the other hand, in another embodiment of the invention, if it is alternatively determined that the cardinality equals or exceeds the cardinality threshold, then the process alternatively ends.

In Step 806, after determining (in Step 804) that the cardinality of the edge(s) (identified in Step 802) is less than the above-mentioned cardinality threshold, a server candidate tag is assigned to the given node. In one embodiment of the invention, the server candidate tag may refer to a unique label (i.e., network device metadata) used to associate the given node with a server candidate network device role. A server candidate may refer to a network device regarded as suitable (though not yet confirmed) for designation of the server network device role.

Figure 9:
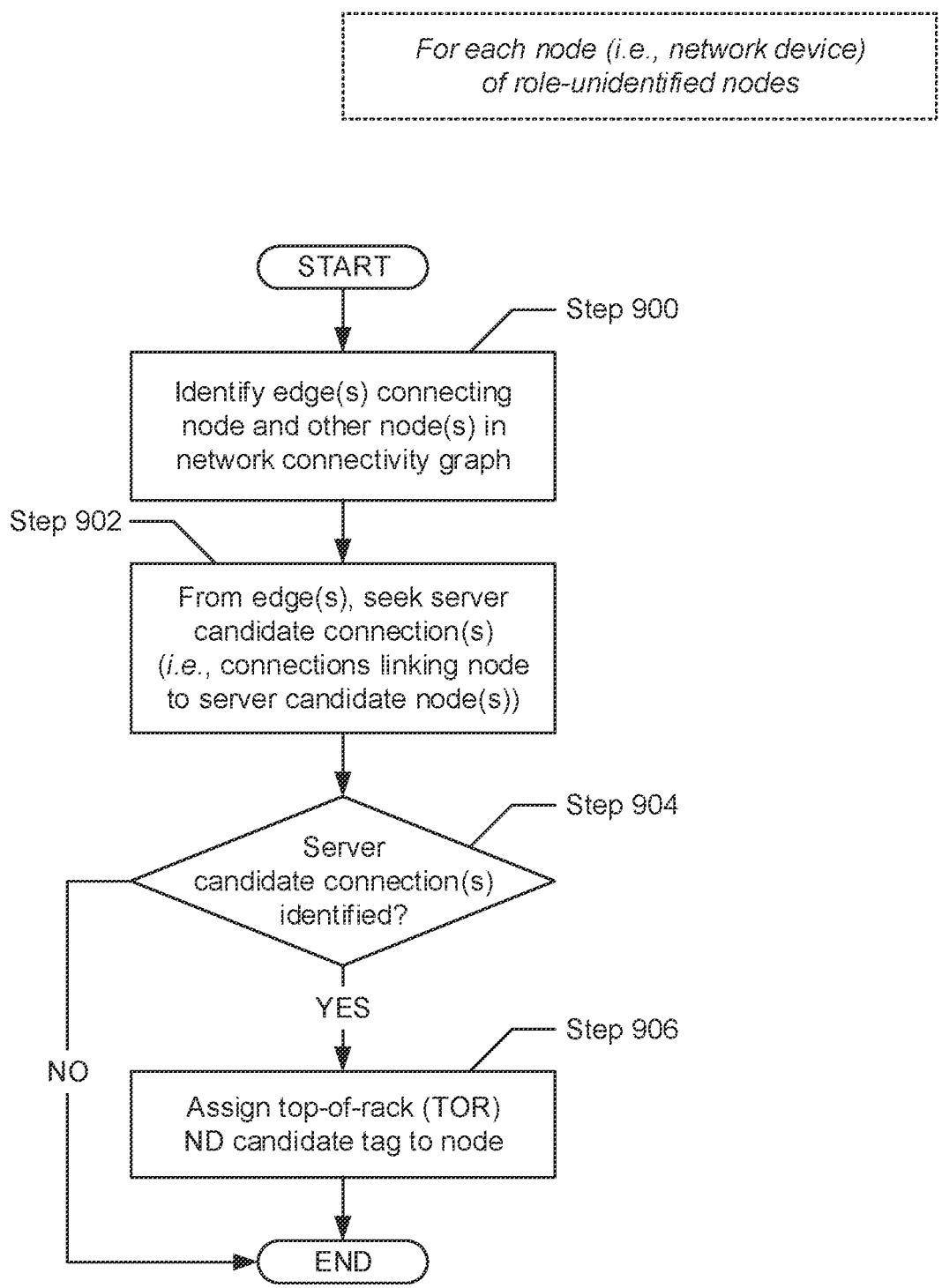
FIG. 9 shows a flowchart describing a method for identifying top-of-rack network device candidates in accordance with one or more embodiments of the invention.

FIG. 9 shows a flowchart describing a method for identifying top-of-rack network device candidates in accordance with one or more embodiments of the invention. The various steps outlined below may be performed by the network analysis service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Hereinafter, the various steps outlined below—representative of an iteration of the described method—may be performed for each node of a set of role-unidentified nodes of a network connectivity graph (see e.g., FIG. 2C) for a given network. In one embodiment of the invention, the set of role-unidentified nodes may include all the nodes of the network connectivity graph excluding the nodes representative of top-of-rack (TOR) network devices (see e.g., FIG. 7) and server candidate network devices (see e.g., FIG. 8).

Accordingly, in Step 900, one or more edges, associated with a given node, is/are identified. In one embodiment of the invention, each identified edge may represent a connection between the given node (i.e., a given network device) and another node (i.e., another network device) of the network connectivity graph (i.e., the network).

In Step 902, based on the edge(s) (identified in Step 900), one or more server candidate connections is/are sought (i.e., attempted to be identified). In one embodiment of the invention, a server candidate may refer to a network device regarded as suitable for designation of the server network device role, which may have been bestowed upon the network device through the method described in FIG. 8. A server candidate connection, accordingly, may refer to an edge (i.e., connection) interconnecting the given node to a server candidate.

In Step 904, a determination is made as to whether at least one server candidate connection has been identified for the given node. In one embodiment of the invention, if it is determined that the edge(s) include at least one server candidate connection, then the process proceeds to Step 906. On the other hand, in another embodiment of the invention, if it is alternatively determined that a server candidate connection is not represented in the edge(s), then the process alternatively ends.

In Step 906, after determining (in Step 904) that at least one server candidate connection is represented amongst the edge(s) (identified in Step 902), a top-of-rack (TOR) network device candidate tag is assigned to the given node. In one embodiment of the invention, the TOR network device candidate tag may refer to a unique label (i.e., network device metadata) used to associate the given node with a TOR network device candidate network device role. A TOR network device candidate may refer to a network device regarded as suitable (though not yet confirmed) for designation of the TOR network device network device role.

Figure 10:
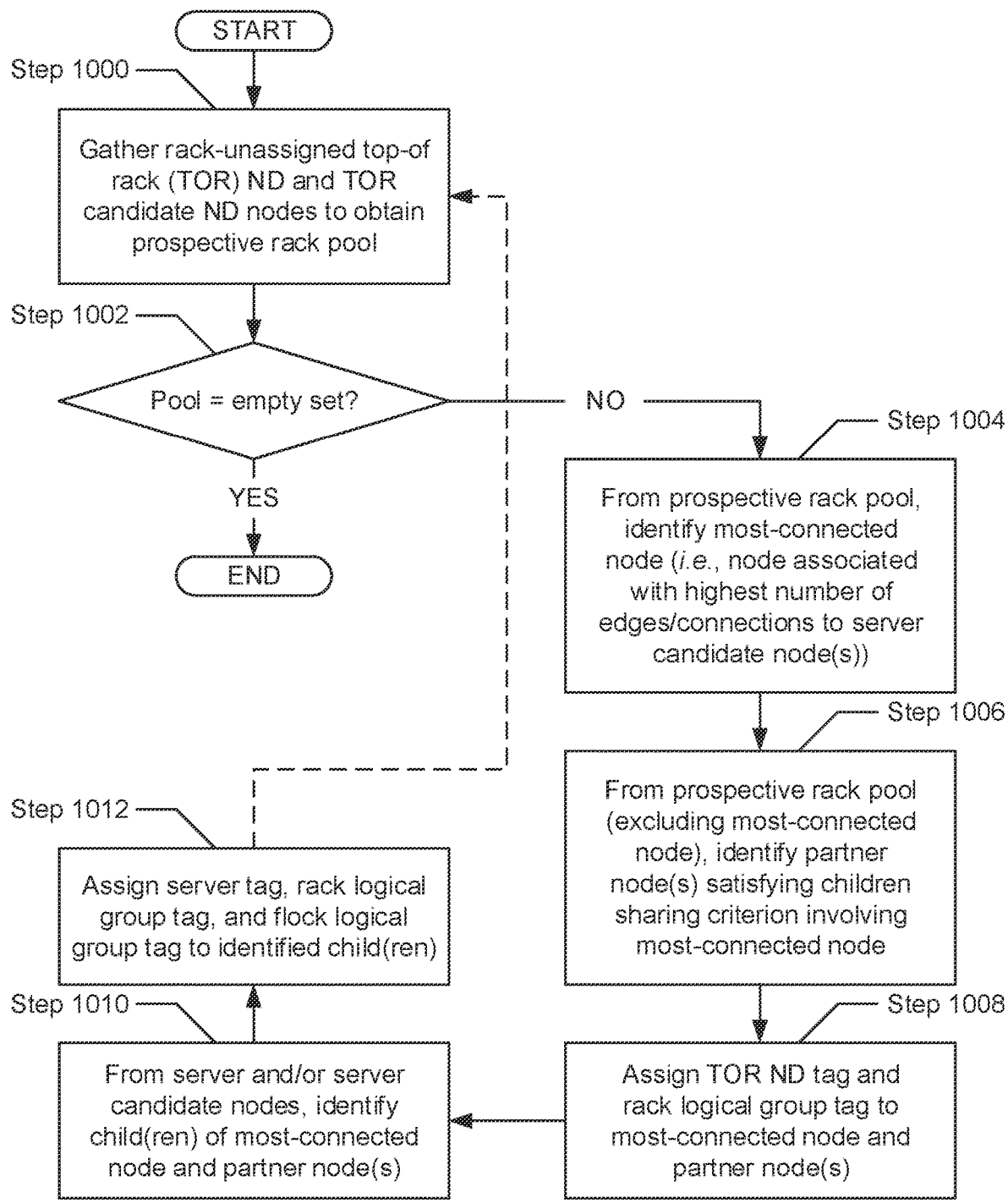
FIG. 10 shows a flowchart describing a method for identifying rack logical groups in accordance with one or more embodiments of the invention.

FIG. 10 shows a flowchart describing a method for identifying rack logical groups in accordance with one or more embodiments of the invention. The various steps outlined below may be performed by the network analysis service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

In Step 1000, a prospective rack pool is obtained. In one embodiment of the invention, the prospective rack pool may refer to a collection of nodes—representative of top-of-rack (TOR) network devices and TOR network device candidates—that have yet to be assigned to a rack logical group.

In Step 1002, a determination is made as to whether the prospective rack pool (obtained in Step 1000) is representative of an empty set—i.e., includes zero nodes. Accordingly, in one embodiment of the invention, if it is determined that the prospective rack pool includes at least one node, then the process proceeds to Step 1004. On the other hand, in another embodiment of the invention, if it is alternatively determined that the prospective rack pool includes zero nodes, then the process alternatively ends.

In Step 1004, after determining (in Step 1002) that the prospective rack pool (obtained in Step 1000) is not representative of an empty set, a most-connected node is identified from the prospective rack pool. In one embodiment of the invention, the most-connected node may refer to the node associated with the most or highest number of edges (i.e., connections) to servers and/or server candidates (described above).

In Step 1006, from the remainder of the prospective rack pool (obtained in Step 1000)—i.e., excluding the most-connected node (identified in Step 1004)—one or more partner nodes is/are identified. In one embodiment of the invention, a partner node may refer to any node that satisfies a children sharing criterion involving the most-connected node (identified in Step 1004). By way of an example, the children sharing criterion may require that the most-connected node and a partner node exhibit connections to a threshold percentage (e.g., 75%) of common nodes representative of servers and/or server candidates.

In Step 1008, the most-connected node (identified in Step 1004) and the partner node(s) (identified in Step 1006) are each assigned a TOR network device tag and a rack logical group tag. In one embodiment of the invention, the TOR network device tag may refer to a unique label (i.e., network device metadata) used to associate the given node with a TOR network device network device role, whereas the rack logical group tag may refer to another unique label used to associate the given node with a rack logical group.

In Step 1010, from a set of server and/or server candidate nodes, a child or multiple children nodes of the most-connected node (identified in Step 1004) and the partner node(s) (identified in Step 1006) is/are identified.

In Step 1012, the child node or multiple children nodes (identified in Step 1010) is/are each assigned a server tag, a rack logical group tag, and a flock logical group tag. In one embodiment of the invention, the server tag may refer to a unique label (i.e., network device metadata) used to associate the given node with a server network device role; the rack logical group tag may refer to another unique label used to associate the given node with a rack logical group (i.e., the same rack logical group to which the most-connected node and the partner node(s) had been assigned in Step 1008); and the flock logical group tag may refer to yet another unique label used to associate the given node with a flock logical group.

Figure 11:
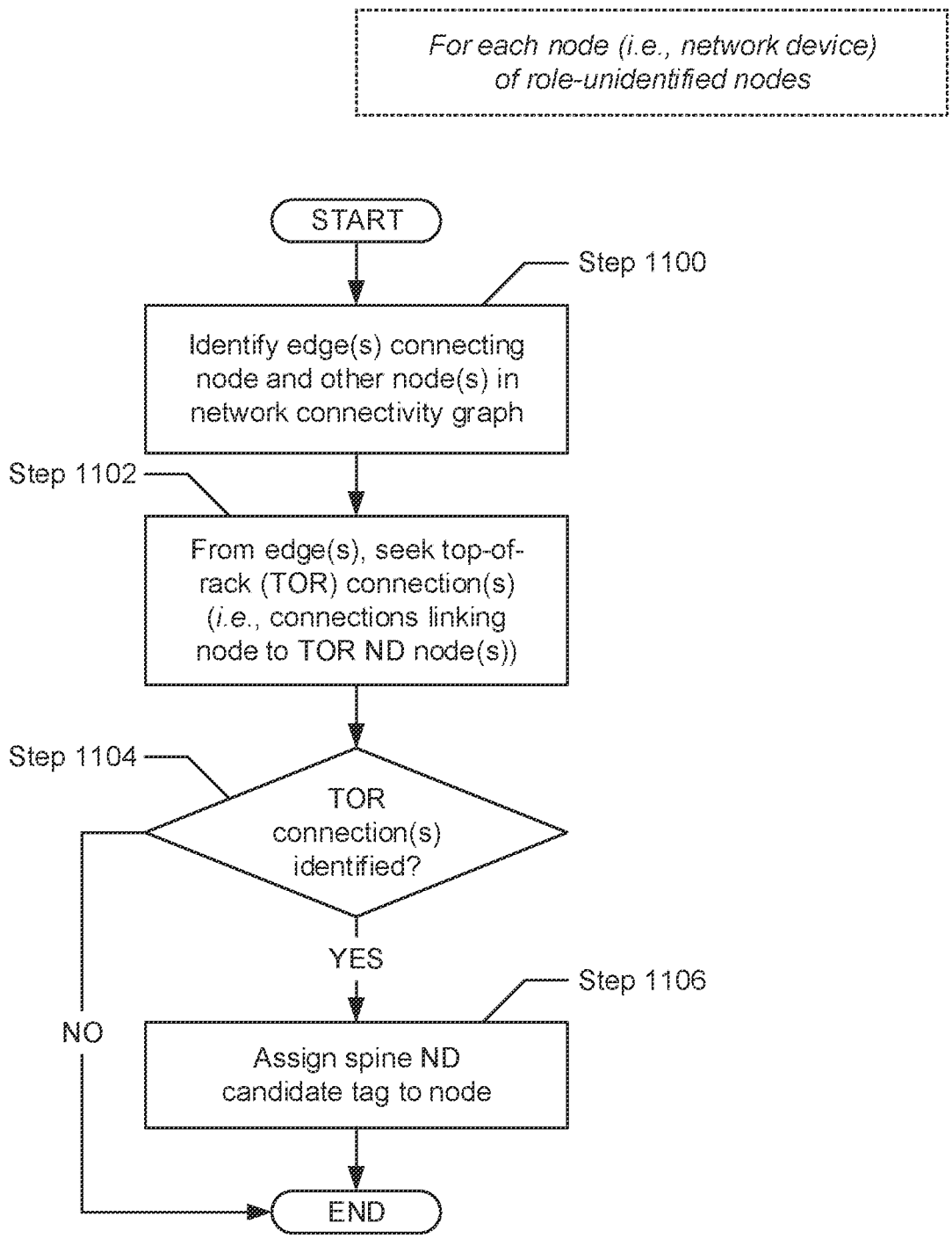
FIG. 11 shows a flowchart describing a method for identifying spine network device candidates in accordance with one or more embodiments of the invention.

FIG. 11 shows a flowchart describing a method for identifying spine network device candidates in accordance with one or more embodiments of the invention. The various steps outlined below may be performed by the network analysis service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Hereinafter, the various steps outlined below—representative of an iteration of the described method—may be performed for each node of a set of role-unidentified nodes of a network connectivity graph (see e.g., FIG. 2C) for a given network. In one embodiment of the invention, the set of role-unidentified nodes may include all nodes of the network connectivity graph excluding nodes representative of top-of-rack (TOR) network devices (see e.g., FIG. 7), server candidate network devices (see e.g., FIG. 8), and TOR candidate network devices (see e.g., FIG. 9).

Accordingly, in Step 1100, one or more edges, associated with a given node, is/are identified. In one embodiment of the invention, each identified edge may represent a connection between the given node (i.e., a given network device) and another node (i.e., another network device) of the network connectivity graph (i.e., the network).

In Step 1102, based on the edge(s) (identified in Step 1100), one or more top-of-rack (TOR) connections is/are sought (i.e., attempted to be identified). In one embodiment of the invention, a TOR network device may refer to a network device regarded as suitable (and confirmed) for designation of the TOR network device network device role, which may have been bestowed upon the network device through the method described in FIG. 7 or FIG. 10. A TOR network device connection, accordingly, may refer to an edge (i.e., connection) interconnecting the given node to a confirmed TOR network device.

In Step 1104, a determination is made as to whether at least one TOR connection has been identified for the given node. In one embodiment of the invention, if it is determined that the edge(s) include at least one TOR connection, then the process proceeds to Step 1106. On the other hand, in another embodiment of the invention, if it is alternatively determined that a TOR connection is not represented in the edge(s), then the process alternatively ends.

In Step 1106, after determining (in Step 1104) that at least one TOR connection is represented amongst the edge(s) (identified in Step 1102), a spine network device candidate tag is assigned to the given node. In one embodiment of the invention, the spine network device candidate tag may refer to a unique label (i.e., network device metadata) used to associate the given node with a spine network device candidate network device role. A spine network device candidate may refer to a network device regarded as suitable (though not yet confirmed) for designation of the spine network device network device role.

Figure 12:
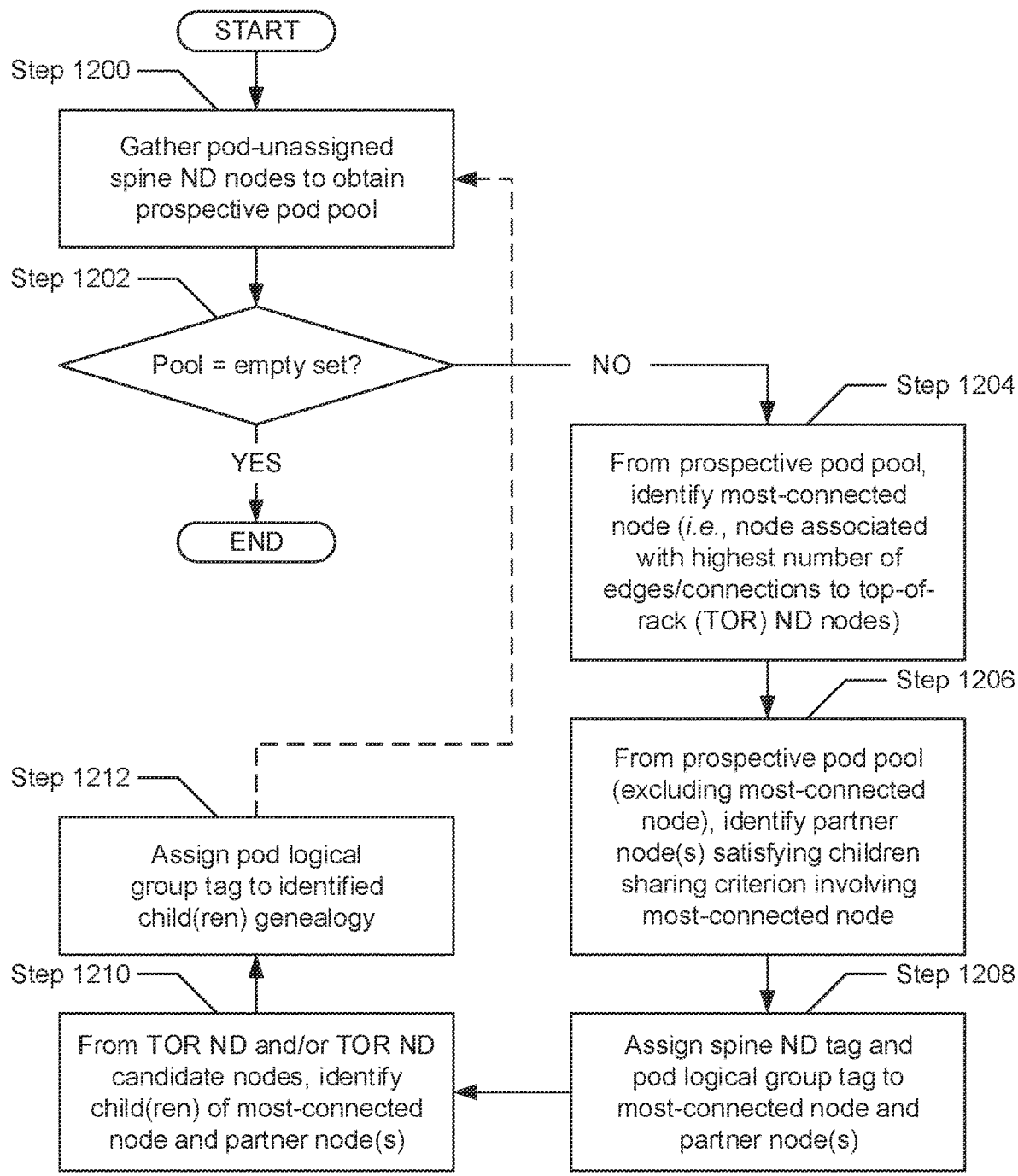
FIG. 12 shows a flowchart describing a method for identifying pod logical groups in accordance with one or more embodiments of the invention.

FIG. 12 shows a flowchart describing a method for identifying pod logical groups in accordance with one or more embodiments of the invention. The various steps outlined below may be performed by the network analysis service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

In Step 1200, a prospective pod pool is obtained. In one embodiment of the invention, the prospective pod pool may refer to a collection of nodes—representative of spine network devices and spine network device candidates—that have yet to be assigned to a pod logical group.

In Step 1202, a determination is made as to whether the prospective pod pool (obtained in Step 1200) is representative of an empty set—i.e., includes zero nodes. Accordingly, in one embodiment of the invention, if it is determined that the prospective pod pool includes at least one node, then the process proceeds to Step 1204. On the other hand, in another embodiment of the invention, if it is alternatively determined that the prospective pod pool includes zero nodes, then the process alternatively ends.

In Step 1204, after determining (in Step 1202) that the prospective pod pool (obtained in Step 1200) is not representative of an empty set, a most-connected node is identified from the prospective pod pool. In one embodiment of the invention, the most-connected node may refer to the node associated with the most or highest number of edges (i.e., connections) to TOR network devices and/or TOR network device candidates.

In Step 1206, from the remainder of the prospective pod pool (obtained in Step 1200)—i.e., excluding the most-connected node (identified in Step 1204)—one or more partner nodes is/are identified. In one embodiment of the invention, a partner node may refer to any node that satisfies a children sharing criterion involving the most-connected node (identified in Step 1204). By way of an example, the children sharing criterion may require that the most-connected node and a partner node exhibit connections to a threshold percentage (e.g., 75%) of common nodes representative of TOR network devices and/or TOR network device candidates.

In Step 1208, the most-connected node (identified in Step 1204) and the partner node(s) (identified in Step 1206) are each assigned a spine network device tag and a pod logical group tag. In one embodiment of the invention, the spine network device tag may refer to a unique label (i.e., network device metadata) used to associate the given node with a spine network device network device role, whereas the pod logical group tag may refer to a unique label used to associate the given node with a pod logical group.

In Step 1210, from a set of TOR network device and/or TOR network device candidate nodes, a child or multiple children nodes of the most-connected node (identified in Step 1204) and the partner node(s) (identified in Step 1206) is/are identified.

In Step 1212, a genealogy of nodes, stemming from and including the child node or multiple children nodes (identified in Step 1210), is/are each assigned a pod logical group tag. In one embodiment of the invention, the pod logical group tag may refer to a unique label (i.e., network device metadata) used to associate the given node with a pod logical group (i.e., the same pod logical group to which the most-connected node and the partner node(s) had been assigned in Step 1208).

That is, for example, assume that three children nodes (i.e., three nodes representative of TOR network devices and/or TOR network device candidates) had been identified—e.g., a first child node, a second child node, and a third child node. A first genealogy of nodes, stemming from the first child node, may include a first set (or flock) of servers; a genealogy of nodes, stemming from the second child node, may include a second set (or flock) of servers; and a genealogy of nodes, stemming from the third child node, may include a third set (or flock) of servers. Accordingly, the nodes further assigned to the above-mentioned pod logical group may include the three children nodes, the first flock of servers, the second flock of servers, and the third flock of servers.

Figure 13:
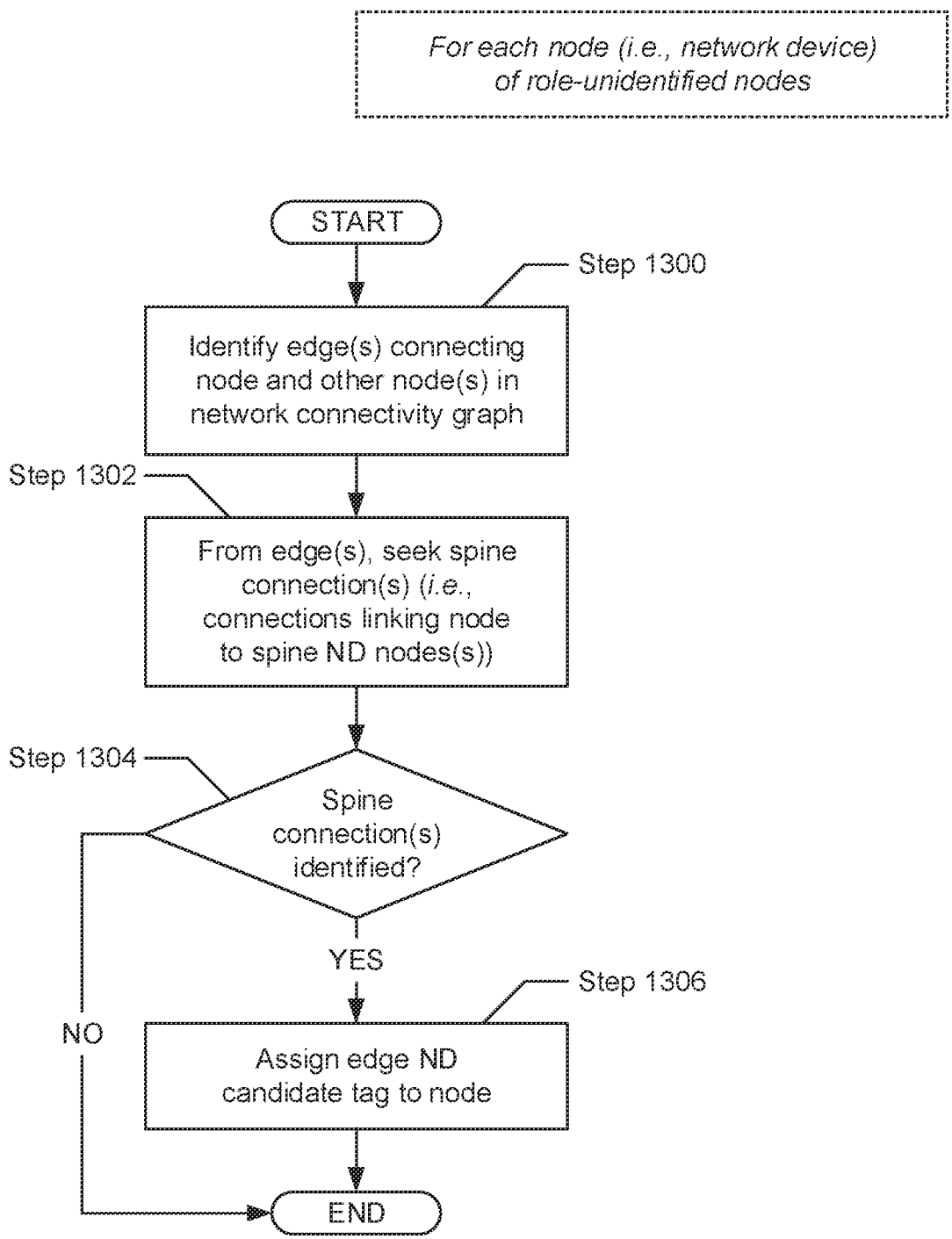
FIG. 13 shows a flowchart describing a method for identifying edge network device candidates in accordance with one or more embodiments of the invention.

FIG. 13 shows a flowchart describing a method for identifying edge network device candidates in accordance with one or more embodiments of the invention. The various steps outlined below may be performed by the network analysis service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Hereinafter, the various steps outlined below—representative of an iteration of the described method—may be performed for each node of a set of role-unidentified nodes of a network connectivity graph (see e.g., FIG. 2C) for a given network. In one embodiment of the invention, the set of role-unidentified nodes may include all nodes of the network connectivity graph excluding nodes representative of top-of-rack (TOR) network devices (see e.g., FIG. 7), server candidate network devices (see e.g., FIG. 8), TOR candidate network devices (see e.g., FIG. 9), and spine candidate network devices (see e.g., FIG. 11).

Accordingly, in Step 1300, one or more edges, associated with a given node, is/are identified. In one embodiment of the invention, each identified edge may represent a connection between the given node (i.e., a given network device) and another node (i.e., another network device) of the network connectivity graph (i.e., the network).

In Step 1302, based on the edge(s) (identified in Step 1300), one or more spine connections is/are sought (i.e., attempted to be identified). In one embodiment of the invention, a spine network device may refer to a network device regarded as suitable (and confirmed) for designation of the spine network device network device role, which may have been bestowed upon the network device through the method described in FIG. 12. A spine network device connection, accordingly, may refer to an edge (i.e., connection) interconnecting the given node to a confirmed spine network device.

In Step 1304, a determination is made as to whether at least one spine connection has been identified for the given node. In one embodiment of the invention, if it is determined that the edge(s) include at least one spine connection, then the process proceeds to Step 1306. On the other hand, in another embodiment of the invention, if it is alternatively determined that a spine connection is not represented in the edge(s), then the process alternatively ends.

In Step 1306, after determining (in Step 1304) that at least one spine connection is represented amongst the edge(s) (identified in Step 1302), an edge network device candidate tag is assigned to the given node. In one embodiment of the invention, the edge network device candidate tag may refer to a unique label (i.e., network device metadata) used to associate the given node with an edge network device candidate network device role.

Figure 14:
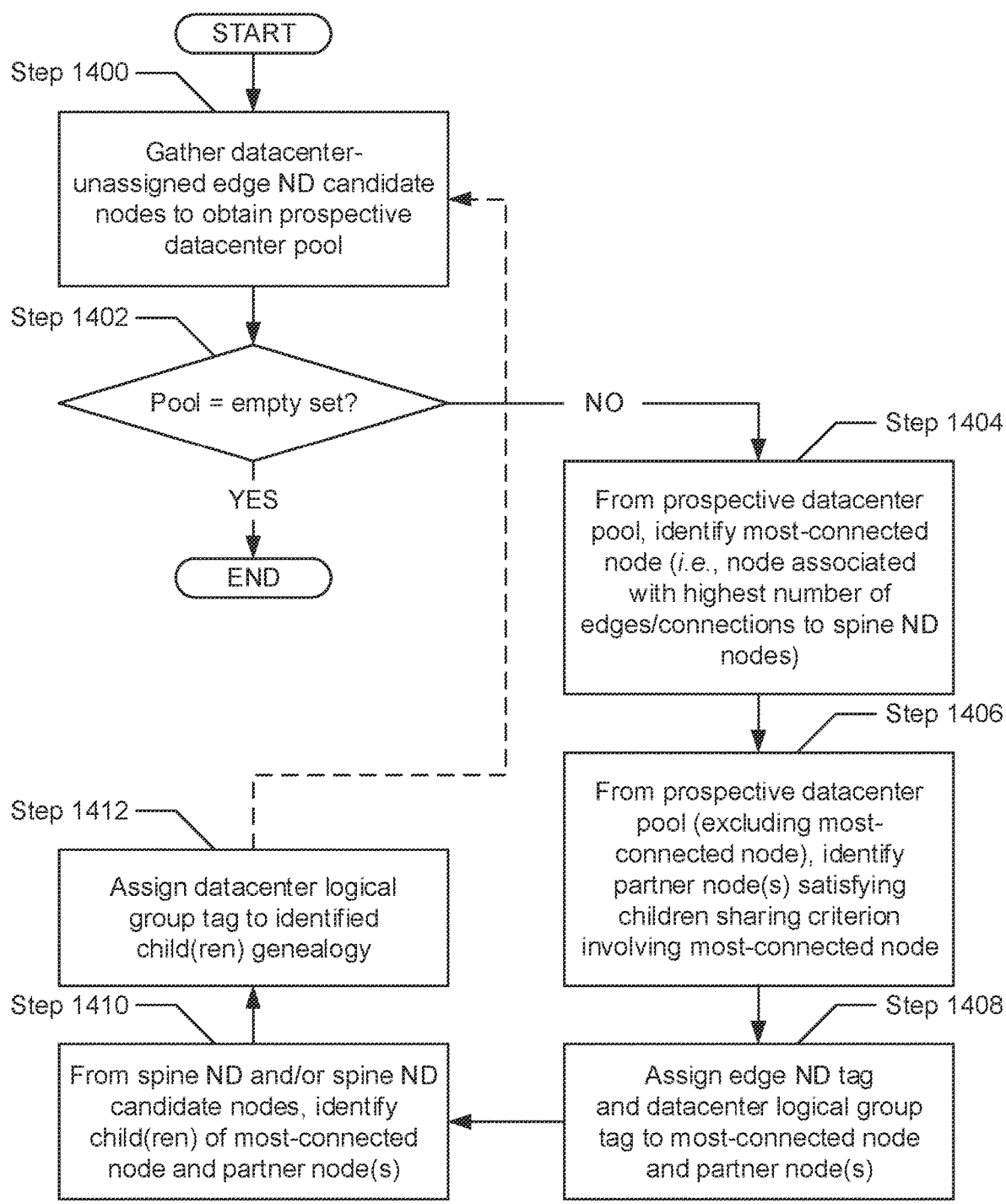
FIG. 14 shows a flowchart describing a method for identifying datacenter logical groups in accordance with one or more embodiments of the invention.

FIG. 14 shows a flowchart describing a method for identifying datacenter logical groups in accordance with one or more embodiments of the invention. The various steps outlined below may be performed by the network analysis service (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

In Step 1400, a prospective datacenter pool is obtained. In one embodiment of the invention, the prospective datacenter pool may refer to a collection of nodes—representative of edge network devices and edge network device candidates—that have yet to be assigned to a datacenter logical group.

In Step 1402, a determination is made as to whether the prospective datacenter pool (obtained in Step 1400) is representative of an empty set—i.e., includes zero nodes. Accordingly, in one embodiment of the invention, if it is determined that the prospective datacenter pool includes at least one node, then the process proceeds to Step 1404. On the other hand, in another embodiment of the invention, if it is alternatively determined that the prospective datacenter pool includes zero nodes, then the process alternatively ends.

In Step 1404, after determining (in Step 1402) that the prospective datacenter pool (obtained in Step 1400) is not representative of an empty set, a most-connected node is identified from the prospective datacenter pool. In one embodiment of the invention, the most-connected node may refer to the node associated with the most or highest number of edges (i.e., connections) to spine network devices and/or spine network device candidates.

In Step 1406, from the remainder of the prospective datacenter pool (obtained in Step 1400)—i.e., excluding the most-connected node (identified in Step 1404)—one or more partner nodes is/are identified. In one embodiment of the invention, a partner node may refer to any node that satisfies a children sharing criterion involving the most-connected node (identified in Step 1304). By way of an example, the children sharing criterion may require that the most-connected node and a partner node exhibit connections to a threshold percentage (e.g., 75%) of common nodes representative of spine network devices and/or spine network device candidates.

In Step 1408, the most-connected node (identified in Step 1404) and the partner node(s) (identified in Step 1406) are each assigned an edge network device tag and a datacenter logical group tag. In one embodiment of the invention, the edge network device tag may refer to a unique label (i.e., network device metadata) used to associate the given node with an edge network device network device role, whereas the datacenter logical group tag may refer to another unique label used to associate the given node with a datacenter logical group.

In Step 1410, from a set of spine network device and/or spine network device candidate nodes, a child or multiple children nodes of the most-connected node (identified in Step 1404) and the partner node(s) (identified in Step 1406) is/are identified.

In Step 1412, a genealogy of nodes, stemming from and including the child node or multiple children nodes (identified in Step 1410), is/are each assigned a datacenter logical group tag. In one embodiment of the invention, the datacenter logical group tag may refer to a unique label (i.e., network device metadata) used to associate the given node with a datacenter logical group (i.e., the same datacenter logical group to which the most-connected node and the partner node(s) had been assigned in Step 1408).

That is, for example, assume that three children nodes (i.e., three nodes representative of spine network devices and/or spine network device candidates) had been identified—e.g., a first child node, a second child node, and a third child node. A first genealogy of nodes, stemming from the first child node, may include a first set (or pod) of nodes representative of a first set of TOR network devices and first set (or flock) of servers; a genealogy of nodes, stemming from the second child node, may include a second set (or pod) of nodes representative of a second set of TOR network devices and a second set (or flock) of servers; and a genealogy of nodes, stemming from the third child node, may include a third set (or pod) of nodes representative of a third set of TOR network devices and a third set (or flock) of servers. Accordingly, the nodes further assigned to the above-mentioned pod logical group may include the three children nodes, the first set of TOR network devices, the second set of TOR network devices, the third set of TOR network devices, the first flock of servers, the second flock of servers, and the third flock of servers.

Figure 15:
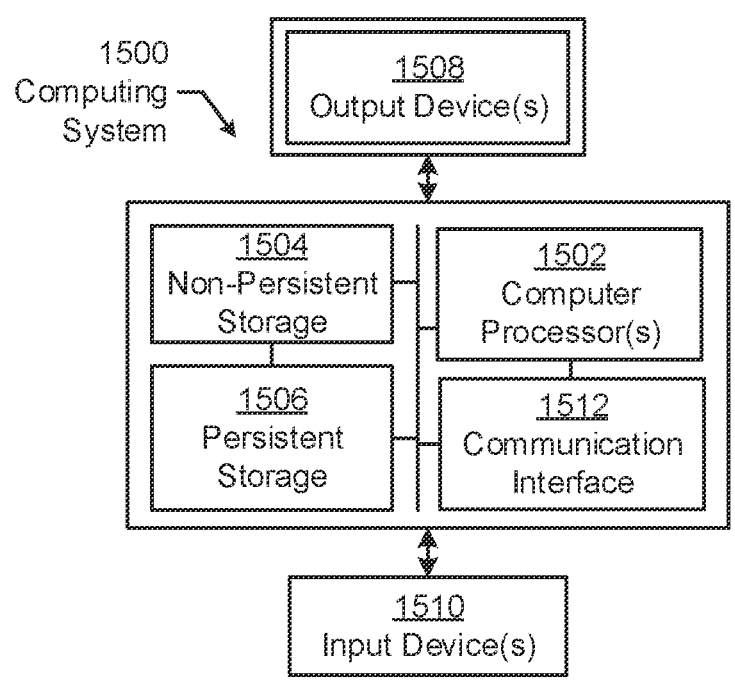
FIG. 15 shows an exemplary computing system in accordance with one or more embodiments of the invention.

FIG. 15 shows an exemplary computing system in accordance with one or more embodiments of the invention. The computing system (1500) may include one or more computer processors (1502), non-persistent storage (1504) (e.g., volatile memory, such as random access memory (RAM), cache memory), persistent storage (1506) (e.g., a hard disk, an optical drive such as a compact disk (CD) drive or digital versatile disk (DVD) drive, a flash memory, etc.), a communication interface (1512) (e.g., Bluetooth interface, infrared interface, network interface, optical interface, etc.), input devices (1510), output devices (1508), and numerous other elements (not shown) and functionalities. Each of these components is described below.

In one embodiment of the invention, the computer processor(s) (1502) may be an integrated circuit for processing instructions. For example, the computer processor(s) may be one or more cores or micro-cores of a central processing unit (CPU) and/or a graphics processing unit (GPU). The computing system (1500) may also include one or more input devices (1510), such as a touchscreen, keyboard, mouse, microphone, touchpad, electronic pen, or any other type of input device. Further, the communication interface (1512) may include an integrated circuit for connecting the computing system (1500) to a network (not shown) (e.g., a local area network (LAN), a wide area network (WAN) such as the Internet, mobile network, or any other type of network) and/or to another device, such as another computing device.

In one embodiment of the invention, the computing system (1500) may include one or more output devices (1508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1502), non-persistent storage (1504), and persistent storage (1506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention may not be limited to the designation of network device roles to network devices, and/or the clustering of network devices into logical groups (as described above). That is, one or more embodiments of the invention may further entail the designation of network interface tags (or labels) to network interfaces (also referred to as endpoints) on either side of connections between pairs of network devices in a network. Specifically, for each connection between a pair of network devices: (a) a first network interface (i.e., at one end of the connection) on the first network device may represent an uplink, whereas a second network interface (i.e., at the other end of the connection) on the second network device may represent a downlink; or (b) both the first and second network interfaces (i.e., at both ends of the connection) on the first and second network devices, respectively, may each represent a peer-link.

In one embodiment of the invention, an uplink may refer to a network interface on a first network device associated with a given connection, where the first network device resides at an inferior topological level (or layer) than a second network device associated with the given connection. In such an embodiment, the first network device may be designated a network device role (e.g., server network device) that is inferior, at least topologically, to another network device role (e.g., top-of-rack network device) assigned to the second network device.

In one embodiment of the invention, a downlink may refer to a network interface on a first network device associated with a given connection, where the first network device resides at a superior topological level (or layer) than a second network device associated with the given connection. In such an embodiment, the first network device may be designated a network device role (e.g., top-of-rack network device) that is superior, at least topologically, to another network device role (e.g., server network device) assigned to the second network device.

In one embodiment of the invention, a peer-link may refer to a network interface on either a first network device or a second network device associated with a given connection, where the first and second network devices reside at the same topological level (or layer). In such an embodiment, the first and second network devices of the given connection, may both be designated the same network device role (e.g., both are top-of-rack network devices).

In one embodiment of the invention, the designation of network interface tags, to network interfaces, may be useful with respect to the generation of alerts and/or events. For example, alerts may be issued upon detecting failures across any uplinks on network devices designated a given network device role. By way of another example, alerts may be issued when specific parameters (or metadata) associated with one or more given network interfaces are different than that which may be expected.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for network classification, comprising:
    obtaining network topology information for a network, the network topology information comprising a plurality of nodes representing network devices, wherein the nodes are interconnected by a plurality of edges representing connections between pairs of the network devices; and
    assigning network device roles to at least a portion of the plurality of nodes based on at least a portion of the plurality of edges and a set of network device classification heuristics, wherein assigning the network device roles comprises:
        identifying a first set of the nodes as top-of-rack switch (TOR) candidates based on the edges connected to each of the nodes in the first set;
        identifying a second set of the nodes as server candidates based on the edges connected to each of the nodes in the second set;
        tagging a first portion of the TOR candidates as TORs based on the edges connected to each of the TOR candidates;
        tagging a portion of the server candidates as servers based on the edges connected to each of the server candidates.

2. The method of claim 1, wherein identifying the TOR candidates comprises: for each node of the first set of nodes: identifying a set of connections associated with the node; seeking a multi-chassis link aggregation group (MLAG) connection from the set of connections; making a determination that at least one MLAG connection has been identified.

3. The method of claim 2, identifying, from an untagged portion of the first set of the nodes, a third set of the nodes as additional TOR candidates based on the edges connected to each of the untagged nodes, wherein identifying the additional TOR candidates comprises: identifying a set of connections associated with each untagged node; seeking a server connection from the set of connections; and making a determination that at least one server connection has been identified.

4. The method of claim 1, wherein identifying the server candidates comprises: for each node of the second set of nodes: identifying a set of connections associated with the node; identifying a cardinality for the set of connections; making a determination that the cardinality is less than a threshold cardinality value; and assigning, based on the determination and to the node, a network device role tag associated with a candidate for the second class of network devices.

5. The method of claim 1, further comprising identifying rack logical groups by:
    (a) gathering rack-unassigned TORs and the TOR candidates in a prospective rack pool;
    (b) identifying, from the prospective rack pool, a most-connected node;
    (c) identifying, from a remainder of the prospective rack pool, one or more partner nodes which share children with the most-connected node;
    (d) assigning a TOR tag and a rack logical group tag to the most-connected node and the one or more partner nodes;
    (e) identifying, from the server and the server candidates, children of the most-connected node and the one or more partner nodes; and
    (f) assigning a server tag, the rack logical group tag and a flock logical group tag to the identified children.

6. The method of claim 5, further comprising determining whether the prospective rack pool is empty and, if the prospective rack pool is not empty, repeating steps (a)-(f).

7. The method of claim 1, further comprising partitioning the plurality of nodes into a set of management nodes and a set of non-management nodes, wherein the set of management nodes comprises the first set of the nodes.

8. The method of claim 1, further comprising partitioning the plurality of nodes into a set of management nodes and a set of non-management nodes, wherein the set of non-management nodes comprises the second set of the nodes.

9. A non-transitory computer readable medium (CRM) comprising computer readable program code, which when executed by a computer processor, enables the computer processor to perform a method for network classification, the method comprising:
    obtaining network topology information for a network, the network topology information comprising a plurality of nodes representing network devices, wherein the nodes are interconnected by a plurality of edges representing connections between pairs of the network devices; and assigning network device roles to at least a portion of the plurality of nodes based on at least a portion of the plurality of edges and a set of network device classification heuristics, wherein assigning the network device roles comprises:
identifying a first set of the nodes as top-of-rack switch (TOR) candidates based on the edges connected to each of the nodes in the first set;
identifying a second set of the nodes as server candidates based on the edges connected to each of the nodes in the second set;
tagging a first portion of the TOR candidates as TORs based on the edges connected to each of the TOR candidates;
tagging a portion of the server candidates as servers based on the edges connected to each of the server candidates.

10. The non-transitory CRM of claim 9, wherein identifying the TOR candidates comprises: for each node of the first set of nodes: identifying a set of connections associated with the node; seeking a multi-chassis link aggregation group (MLAG) connection from the set of connections; making a determination that at least one MLAG connection has been identified.

11. The non-transitory CRM of claim 10, identifying, from an untagged portion of the first set of the nodes, a third set of the nodes as additional TOR candidates based on the edges connected to each of the untagged nodes, wherein identifying the additional TOR candidates comprises: identifying a set of connections associated with each untagged node; seeking a server connection from the set of connections; and making a determination that at least one server connection has been identified.

12. The non-transitory CRM of claim 9, wherein identifying the server candidates comprises: for each node of the second set of nodes: identifying a set of connections associated with the node; identifying a cardinality for the set of connections; making a determination that the cardinality is less than a threshold cardinality value; and assigning, based on the determination and to the node, a network device role tag associated with a candidate for the second class of network devices.

13. The non-transitory CRM of claim 9, further comprising identifying rack logical groups by:
(a) gathering rack-unassigned TORs and the TOR candidates in a prospective rack pool;
(b) identifying, from the prospective rack pool, a most-connected node;
(c) identifying, from a remainder of the prospective rack pool, one or more partner nodes which share children with the most-connected node;
(d) assigning a TOR tag and a rack logical group tag to the most-connected node and the one or more partner nodes
(e) identifying, from the server and the server candidates, children of the most-connected node and the one or more partner nodes;
(f) assigning a server tag, the rack logical group tag and a flock logical group tag to the identified children; and
(g) determining whether the prospective rack pool is empty and, if the prospective rack pool is not empty, repeating steps (a)-(f).

14. The non-transitory CRM of claim 9, further comprising: partitioning the plurality of nodes into a set of management nodes and a set of non-management nodes, wherein the set of management nodes comprises the first set of the nodes; and partitioning the plurality of nodes into a set of management nodes and a set of non-management nodes, wherein the set of non-management nodes comprises the second set of the nodes.

15. A system, comprising:
a network device operatively connected to a network, the network device configured to perform a method for network classification, the method comprising:
obtaining network topology information for a network, the network topology information comprising a plurality of nodes representing network devices, wherein the nodes are interconnected by a plurality of edges representing connections between pairs of the network devices; and
assigning network device roles to at least a portion of the plurality of nodes based on at least a portion of the plurality of edges and a set of network device classification heuristics,
wherein assigning the network device roles comprises:
identifying a first set of the nodes as top-of-rack switch (TOR) candidates based on the edges connected to each of the nodes in the first set;
identifying a second set of the nodes as server candidates based on the edges connected to each of the nodes in the second set;
tagging a first portion of the TOR candidates as TORs based on the edges connected to each of the TOR candidates;
tagging a portion of the server candidates as servers based on the edges connected to each of the server candidates.

16. The system of claim 15, wherein identifying the TOR candidates comprises: for each node of the first set of nodes: identifying a set of connections associated with the node;
seeking a multi-chassis link aggregation group (MLAG) connection from the set of connections;
making a determination that at least one MLAG connection has been identified.

17. The system of claim 16, identifying, from an untagged portion of the first set of the nodes, a third set of the nodes as additional TOR candidates based on the edges connected to each of the untagged nodes, wherein identifying the additional TOR candidates comprises: identifying a set of connections associated with each untagged node; seeking a server connection from the set of connections; and making a determination that at least one server connection has been identified.

18. The system of claim 15, wherein identifying the server candidates comprises: for each node of the second set of nodes: identifying a set of connections associated with the node; identifying a cardinality for the set of connections; making a determination that the cardinality is less than a threshold cardinality value; and assigning, based on the determination and to the node, a network device role tag associated with a candidate for the second class of network devices.

19. The system of claim 15, further comprising identifying rack logical groups by:
(a) gathering rack-unassigned TORs and the TOR candidates in a prospective rack pool;
(b) identifying, from the prospective rack pool, a most-connected node;

(c) identifying, from a remainder of the prospective rack pool, one or more partner nodes which share children with the most-connected node;
(d) assigning a TOR tag and a rack logical group tag to the most-connected node and the one or more partner nodes;
(e) identifying, from the server and the server candidates, children of the most-connected node and the one or more partner nodes;
(f) assigning a server tag, the rack logical group tag and a flock logical group tag to the identified children; and
(g) determining whether the prospective rack pool is empty and, if the prospective rack pool is not empty, repeating steps (a)-(f).

20. The system of claim 15, further comprising: partitioning the plurality of nodes into a set of management nodes and a set of non-management nodes, wherein the set of management nodes comprises the first set of the nodes; and partitioning the plurality of nodes into a set of management nodes and a set of non-management nodes, wherein the set of non-management nodes comprises the second set of the nodes.

* * * * *